US010322953B2

(12) United States Patent
Ganzi et al.

(10) Patent No.: US 10,322,953 B2
(45) Date of Patent: Jun. 18, 2019

(54) METHOD AND SYSTEM FOR WATER TREATMENT

(71) Applicant: EVOQUA WATER TECHNOLOGIES LLC, Warrendale, PA (US)

(72) Inventors: Gary C. Ganzi, Lexington, MA (US); Frederick C. Wilkins, Pepperell, MA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 15/681,542

(22) Filed: Aug. 21, 2017

(65) Prior Publication Data

US 2017/0362102 A1 Dec. 21, 2017

Related U.S. Application Data

(63) Continuation of application No. 13/599,871, filed on Aug. 30, 2012, which is a continuation-in-part of application No. 11/524,078, filed on Sep. 20, 2006, now Pat. No. 8,277,627.

(60) Provisional application No. 60/805,512, filed on Jun. 22, 2006, provisional application No. 60/804,610, filed on Jun. 13, 2006.

(51) Int. Cl.
| | | |
|---|---|---|
| *C02F 1/469* | (2006.01) | |
| *C02F 9/06* | (2006.01) | |
| *B01D 61/44* | (2006.01) | |
| *B01D 61/46* | (2006.01) | |
| *C02F 1/44* | (2006.01) | |
| *B01D 61/48* | (2006.01) | |

(Continued)

(52) U.S. Cl.
CPC .............. *C02F 1/469* (2013.01); *B01D 61/48* (2013.01); *C02F 1/441* (2013.01); *C02F 1/4693* (2013.01); *C02F 1/4695* (2013.01); *C02F 9/00* (2013.01); *B01D 61/44* (2013.01); *C02F 1/444* (2013.01); *C02F 2103/08* (2013.01); *C02F 2201/46115* (2013.01); *C02F 2301/08* (2013.01); *Y02A 20/131* (2018.01); *Y02A 20/134* (2018.01)

(58) Field of Classification Search
CPC ..................... B01D 61/58; C02F 1/46–1/4698
See application file for complete search history.

(56) References Cited

U.S. PATENT DOCUMENTS

| | | | | |
|---|---|---|---|---|
| 4,160,738 A | * | 7/1979 | Guter | ..................... B01D 61/08 210/232 |
| 4,806,244 A | | 2/1989 | Guilhem | |

(Continued)

FOREIGN PATENT DOCUMENTS

WO        2009038805 A1        3/2009

OTHER PUBLICATIONS

Lesch et al., "A Short Note on Calculating the Adjusted SAR Index" American Society of Agricultural and Biological Engineers, 2009, vol. 52(2), pp. 493-496.

(Continued)

*Primary Examiner* — Steven A. Friday

(57) ABSTRACT

Water treatment systems including electrically-driven and pressure-driven separation apparatus configured to produce a first treated water suitable for use as irrigation water and a second treated water suitable for use as potable water from brackish water and methods of operation of same.

23 Claims, 12 Drawing Sheets

(51) Int. Cl.
*C02F 9/00* (2006.01)
*C02F 103/08* (2006.01)

(56) References Cited

U.S. PATENT DOCUMENTS

| | | | |
|---|---|---|---|
| 5,094,732 A | 3/1992 | Oldani et al. | |
| 5,344,566 A | 9/1994 | Clancey | |
| 5,364,439 A | 11/1994 | Gallup et al. | |
| 6,060,535 A | 5/2000 | Villar et al. | |
| 6,183,643 B1 | 2/2001 | Goodley | |
| 6,365,051 B1 | 4/2002 | Bader | |
| 6,458,257 B1 | 10/2002 | Andrews et al. | |
| 6,462,935 B1 | 10/2002 | Shiue et al. | |
| 8,114,259 B2 | 2/2012 | Zuback et al. | |
| 8,182,693 B2 | 5/2012 | Wilkins et al. | |
| 2002/0104804 A1 | 8/2002 | Grott | |
| 2002/0136749 A1 | 9/2002 | Rose et al. | |
| 2003/0106845 A1 | 6/2003 | Bernard et al. | |
| 2004/0007358 A1 | 1/2004 | Lien | |
| 2004/0055955 A1 | 3/2004 | Davis | |
| 2005/0016922 A1 | 1/2005 | Enzweiler et al. | |
| 2005/0103644 A1 | 5/2005 | Wilkins et al. | |
| 2005/0115906 A1 | 6/2005 | Shay | |
| 2005/0210745 A1 | 9/2005 | Grott | |
| 2006/0060532 A1 | 3/2006 | Davis | |
| 2006/0091077 A1 | 5/2006 | Haas et al. | |
| 2006/0144787 A1 | 7/2006 | Schmidt et al. | |
| 2007/0215344 A1 | 9/2007 | McElhiney | |
| 2007/0284251 A1 | 12/2007 | Zuback et al. | |
| 2007/0284252 A1 | 12/2007 | Ganzi et al. | |
| 2008/0277341 A1 | 11/2008 | Huang et al. | |
| 2009/0314718 A1* | 12/2009 | Sparrow | B01D 61/44 210/669 |
| 2010/0089756 A1 | 4/2010 | Wilkins et al. | |
| 2012/0035394 A1 | 2/2012 | Bicker et al. | |
| 2013/0020259 A1* | 1/2013 | Wallace | B01D 61/58 210/639 |
| 2013/0206689 A1* | 8/2013 | Gibson Juby | B01D 61/58 210/638 |

OTHER PUBLICATIONS

T. Hayes and D. Arthur. "Overview of emerging produced water treatment technologies" The 11th Annual International Petroleum Environmental Conference. Oct. 15, 2004.

Dow Liquid Separations. FILMTEC Membranes (S. S. Beardsley and S. A. McClellan). Membrane Softening: An Emerging Technology Helping Florida Communities Meet the Increased Regulations for Quality Potable Water. Aug. 1997. AWWA 1995 Membrane Technology Conference.

* cited by examiner

METHOD AND SYSTEM FOR WATER TREATMENT

RELATED APPLICATIONS

This application claims the benefit as a continuation under 35 U.S.C. § 120 of U.S. application Ser. No. 13/599,871, titled "METHOD AND SYSTEM FOR WATER TREATMENT," filed on Aug. 30, 2012, which claims priority as a continuation-in part under 35 U.S.C. § 120 of U.S. application Ser. No. 11/524,078, titled "METHOD AND SYSTEM FOR IRRIGATION," filed on Sep. 20, 2006, which claims priority under 35 U.S.C. § 119(e) to U.S. Provisional Application Ser. No. 60/805,512, titled "ELECTRODIALYSIS FOR DESALINATION OF SEAWATER AND BRACKISH WATER FOR AGRICULTURAL USE" filed on Jun. 22, 2006, and to U.S. Provisional Application Ser. No. 60/804,610, titled "ELECTRODIALYSIS AND FILTRATION FOR AGRICULTURAL WATER PRODUCTION," filed on Jun. 13, 2006, each of which are incorporated herein by reference in their entirety.

BACKGROUND OF INVENTION

1. Field of Invention

This invention relates to systems and methods of providing crop irrigation water as well as potable water and, more particularly, to systems and methods of providing irrigation water and/or potable water from water having unacceptable dissolved solids content.

2. Discussion of Related Art

Desalting or desalination refers to a water treatment process that removes salt from, for example, water. In some cases, the water source is brackish water or seawater and desalting techniques thereof provide at least a portion of municipal requirements for potable, drinking water. Desalination techniques typically include those based on distillation as well as reverse osmosis techniques. The desalted water can also be consumed in commercial and industrial applications as, for example, process feed water, boiler feed water, and irrigation water. Particular examples of industries that may utilize desalted water include the pharmaceutical, mining, paper and pulp, and agricultural industries.

SUMMARY OF INVENTION

In accordance with an aspect of the present invention, there is provided a water treatment system. The water treatment system comprises a first electrically-driven separation apparatus including one or more monovalent cation selective membranes and having a first inlet in fluid communication with a source of seawater or brackish water, a pressure-driven separation apparatus configured to produce water suitable for use as agricultural irrigation water and having a second inlet in fluid communication with a diluate outlet of the first electrically-driven separation apparatus, a filtrate outlet, and an agricultural irrigation water outlet, and a second electrically-driven separation apparatus configured to produce water suitable for use as potable water and having a third inlet in fluid communication with the filtrate outlet of the pressure-driven separation apparatus and a potable water outlet.

In accordance with some embodiments, the first electrically-driven separation apparatus includes an electrodialysis unit.

In accordance with some embodiments, the second electrically-driven separation apparatus includes an electrodeionization unit.

In accordance with some embodiments, the first electrically-driven separation further includes one or more monovalent anion selective membranes.

In accordance with some embodiments, the second electrically-driven separation apparatus does not include monovalent ion selective membranes.

In accordance with some embodiments, the pressure-driven separation apparatus includes a water softening filtration membrane.

In accordance with some embodiments, the diluate outlet of the first electrically-driven separation apparatus is in direct fluid communication with the agricultural irrigation water outlet of the pressure-driven separation apparatus.

In accordance with some embodiments, the water treatment system further comprises a concentrate outlet of the second electrically-driven separation apparatus in direct fluid communication with a concentrate makeup inlet of the first electrically-driven separation apparatus.

In accordance with some embodiments, the water treatment system further comprises a concentrate outlet of the second electrically driven separation apparatus in direct fluid communication with a diluate makeup inlet of the first electrically-driven separation apparatus.

In accordance with some embodiments, the water treatment system further comprises a concentrate outlet of the second electrically-driven separation apparatus in direct fluid communication with the second inlet of the pressure-driven separation apparatus.

In accordance with another aspect of the present invention, there is provided a method of treating water. The method comprises directing water to be treated having a level of total dissolved solids of greater than about 1,500 mg/L to an inlet of a first electrically-driven separation apparatus, treating the water to be treated in the first electrically-driven separation apparatus to produce a first diluate, directing a first portion of the first diluate to an inlet of a pressure-driven separation apparatus, treating the first portion of the first diluate in the pressure-driven separation apparatus to produce treated water suitable for use as irrigation water, directing the treated water suitable for use as irrigation water through a concentrate outlet of the pressure-driven separation apparatus to an irrigation water point of use, directing a filtrate from a filtrate outlet of the pressure-driven separation apparatus into an inlet of a second electrically-driven separation apparatus, treating the filtrate from the filtrate outlet of the pressure-driven separation apparatus in the second electrically-driven separation apparatus to produce treated water suitable for use as potable water, and directing the treated water suitable for use as potable water through a diluate outlet of the second electrically-driven separation apparatus to a potable water point of use.

In accordance with some embodiments, the method further comprises directing a second portion of the first diluate to the irrigation water point of use.

In accordance with some embodiments, the method further comprises utilizing a first portion of concentrate from a concentrate outlet of the second electrically-driven separation apparatus as concentrate makeup in the first electrically-driven separation apparatus.

In accordance with some embodiments, the method further comprises utilizing a second portion of concentrate from a concentrate outlet of the second electrically-driven separation apparatus as diluate makeup in the first electrically-driven separation apparatus.

In accordance with some embodiments, the method further comprises directing concentrate from a concentrate outlet of the second electrically-driven separation into the second inlet of the pressure-driven separation apparatus.

In accordance with some embodiments, the method further comprises utilizing concentrate from a concentrate outlet of the second electrically-driven separation apparatus as diluate makeup in the first electrically-driven separation apparatus.

In accordance with some embodiments, the method further comprises directing concentrate from a concentrate outlet of the second electrically-driven separation unit into the second inlet of the pressure-driven separation apparatus.

In accordance with some embodiments, producing treated water suitable for use as irrigation water comprises producing treated water having a SAR value of less than about 20.

In accordance with some embodiments, producing treated water suitable for use as potable water comprises producing water with a TDS level of less than about 500 ppm.

In accordance with an aspect of the present invention, there is provided a water treatment system. The water treatment system comprises a first electrically driven separation apparatus including one or more monovalent cation selective membranes and having a first inlet in fluid communication with a source of water to be treated having a level of total dissolved solids of greater than about 1,500 mg/L, a second electrically driven separation apparatus having a second inlet in fluid communication with a diluate outlet of the first electrically driven separation apparatus and a concentrate outlet in direct fluid communication with the inlet of the first electrically driven separation apparatus, and a pressure-driven separation apparatus configured to produce a first treated water suitable for use as potable water and a second treated water suitable for use as agricultural irrigation water and having a third inlet in fluid communication with a diluate outlet of the second electrically-driven separation apparatus, a potable water outlet, and a agricultural water outlet.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
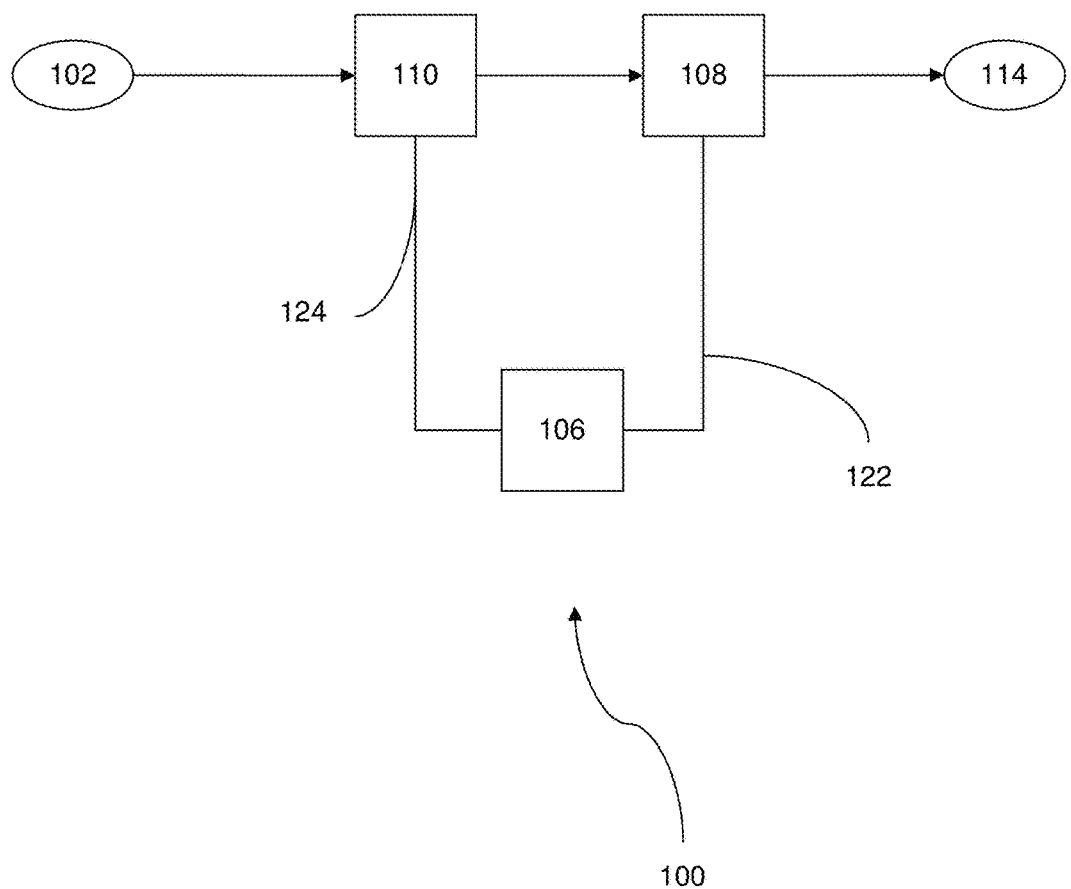
FIG. 1 is a schematic illustration of a system in accordance with one or more features of the invention.

This invention is not limited in its application to the details of construction and the arrangement of components set forth in the following description or illustrated in the drawings. The invention is capable of embodiments and of being practiced or of being carried out in various ways beyond those exemplarily presented herein.

One or more aspects of the invention can involve systems and techniques for providing water suitable for agricultural facilities. Other aspects of the invention can provide potable water or water suitable for human use or consumption as well as for livestock and poultry. Some systems and techniques of the invention can convert or otherwise render non-potable water suitable for agricultural, livestock, poultry, and/or human consumption. Still further aspects of the invention can involve systems and techniques that preferentially or selectively remove some species over other species from a fluid to be treated to provide a product having one or more desirable characteristics. In contrast with non-selective techniques, some selective removal aspects of the invention can be more cost effective by avoiding or reducing additional post-treatment processes, for example, blending. Thus, the systems and techniques of the invention economically provide treated water that is more suitable for an intended use.

In some embodiments of the invention, some types of species are retained in a treated fluid stream while other types of species are preferentially removed. The resultant product fluid can be utilized in various applications and/or otherwise satisfy one or more objectives. Other aspects of the invention can involve systems and techniques that provide water having one or more properties or characteristics tailored to satisfy a particular purpose. Some embodiments of the invention can thus involve systems and techniques that provide one or more water streams or bodies that have one or more attributes that have been adjusted based on one or more parameters of the point of use or facility in which the stream or body is to be utilized.

Even further aspects of the invention can involve systems and techniques that economically provide water for agricultural, industrial, commercial, and/or residential service. Further, some particular aspects of the invention can involve providing water to serve a plurality of requirements or levels of purity or quality. Thus in some embodiments, the systems and techniques of the invention can provide one or more water streams or bodies in a mixed use facility. Particularly advantageous aspects of the invention can involve providing the plurality of water streams or bodies, each of which may have differing water quality levels, from a source of water having high solids content, to a plurality of points of use, each of which may have differing requirements. Such aspects of the invention can provide systems and techniques that treat, for example, non-potable water to render it potable and/or suitable for irrigation, for livestock and/or poultry consumption, and/or for human consumption or use.

In some aspects of the invention, water having a high level of one or more objectionable species dissolved therein can be treated to remove or at least reduce the concentration of such species to an acceptable level. The one or more objectionable species can be any species that render the untreated water unsuitable for a particular application. For example, the water may contain a high level or undesirable concentration of monovalent cations and/or anions which adversely or undesirably hinders retention of water in soil or adsorption of other species, including, for example, divalent or even multivalent species. If the requirement is pertinent to crop irrigation, the undesirable condition or characteristic can involve water that contains one or more species that affects the permeability and/or infiltration properties of the soil being irrigated. For example, some aspects of the invention can involve rendering or treating water to preferentially remove monovalent species over non-monovalent species.

In accordance with one or more particular aspects, the invention can involve embodiments directed to systems and/or methods comprising providing or introducing water to be treated into an electrically-driven separation apparatus. Some embodiments of the invention can involve an irrigation system comprising an electrically-driven separation apparatus fluidly connected, or at least connectable, to one or more sources of water to be treated and at least one irrigation water distribution system.

Other aspects of the invention may involve a method of providing potable water. Some aspects of the invention can provide irrigation water and/or potable water without thermally-driven separation techniques or unit operations. For example, a method in accordance with some embodiments of the invention can comprise one or more acts or steps of providing water to be treated and treating at least a portion of the water to be treated in an electrically-driven separation apparatus to produce a first treated water. The method can further comprise one or more acts of treating a portion of the water to be treated, typically a separate portion, in one or more pressure-driven separation apparatus to produce a second treated water. In some cases, the method can further comprise a step of mixing the first treated water and the second treated water to produce the potable water. The potable water typically has a target or desired total dissolved solids (TDS) content.

Aspects of the invention directed to systems that provide potable water can comprise a source of water to be treated and a pressure-driven separation apparatus having an inlet that is fluidly connected, or at least connectable, to the source of water to be treated. The pressure-driven apparatus can also have one or more outlets, typically at least one product outlet as a treated water outlet. The pressure-driven separation apparatus typically also has at least one reject outlet as an outlet for a stream containing one or more species, typically an undesirable species, removed from the treated water. The system for providing potable water can further comprise one or more electrically-driven separation apparatus which can be fluidly connected, or connectable, to the source of water to be treated, to the pressure-driven separation apparatus, or both. For example, as described in further detail below, one or more electrically-driven separation apparatus can be fluidly connected to a reject outlet of the pressure-driven separation apparatus. In accordance with particular embodiments of the invention, the system for providing potable water can further comprise one or more mixers having one or more inlets fluidly connected, or connectable, to the treated water outlet of the pressure-driven apparatus and the product water outlet of the electrically-driven separation apparatus. The mixer can comprise any mixing unit operation that facilitates at least partially blending or combining one or more product streams including, in some cases, a stream from the source of water to be treated to form a final product stream having one or more desirable characteristics.

The water to be treated can comprise seawater having a TDS of greater than about 5,000 mg/L (5,000 ppm) or more, for example, about 35,000 mg/L (35,000 ppm) or a salinity of between about 3.1% and about 3.8%, brackish water having a TDS of between about 1,500 mg/L (1,500 ppm) and about 5,000 mg/L (5,000 ppm), and/or water containing high concentrations of dissolved solids or salts. Other sources of water to be treated can comprise water that would be unsuitable for use in agricultural facilities because of infiltration and/or toxicity considerations.

The systems and techniques of the invention can comprise, where appropriate, pre-treatment subsystems to facilitate one or more operating principles thereof. One or more pre-treatment and/or post-treatment unit operations may be utilized in one or more embodiments of the invention. For example, the systems and techniques of the invention may comprise a pre-treatment subsystem including one or a plurality of filters that separate or remove at least a portion of any suspended solids from the water to be treated. Such pre-treatment subsystems typically remove particulate material that would damage any downstream unit operation of the systems of the invention. Other pre-treatment unit operations may include, for example, microfilters and/or sedimentary-based systems that can remove suspended solids having characteristic dimensions of, for example, one micron or greater.

Further pre-treatment operations may be utilized to improve the effectiveness of one or more unit operations of the invention. For example, a pre-treatment subsystem can comprise coolers or heaters that, respectively, cool or heat the water to be treated prior to separation operations. Cooling of the raw feed stream, or any intermediate process stream may be performed to, for example, facilitate the transport of an undesirable species, or to hinder the transport of a desirable species, from the stream to be treated. Likewise, heating may be performed to raise the temperature of the raw feed stream, or one or more intermediate process streams, to a desired temperature that, for example, facilitates economical or efficient operation of the one or more separation apparatus. Non-limiting examples of heating processes may involve heaters, furnaces, or heat exchangers that may be associated with or be a unit operation of a process or system of the invention. For example, heating may be provided through a heat exchanger of a power plant that is not necessarily associated with the treatment systems of the invention.

Post-treatment unit operations may polish, remove, or reduce the concentration one or more species in the treated water. For example, one or more ion exchange columns may be utilized to remove species that are not readily removed in the electrically-driven separation apparatus and/or the pressure-driven separation apparatus. Non-limiting examples of species that would typically be removed or at least have a reduction in concentration to, preferably, non-toxic and/or non-objectionable levels, in post-treatment operations include those that may affect soil aggregation, water infiltration, and/or would be toxic to plant growth such as aluminum, arsenic, beryllium, cadmium, cobalt, chromium, copper, iron, fluoride, lithium, manganese, molybdenum, nickel, lead, selenium, tin, titanium, tungsten, vanadium, boron, and zinc. Other species that may be addressed by one or more post-treatment operations include those that may be toxic or objectionable to humans, poultry, and/or livestock in drinking water such as, but not limited to, nitrates, nitrites, vanadium, and sulfides. Disinfecting processes may also be performed to at least partially inactivate or reduce the concentration of colony-forming microorganisms that may be harmful to human and/or livestock.

Alternatively, or in combination with the one or more polishing unit operations, the systems and techniques of the invention may involve adding one or more species to at least a portion of the treated water. For example, gypsum may be added to adjust the concentration of one or more desirable species or adjust a characteristic of the water. Other additives may include fertilizers or other supplements that facilitate crop growth when the water is used for irrigation.

An electrically-driven apparatus typically utilizes a potential field to create a motive force that induces one or more species, typically the target species, which can include desirable as well as undesirable species, to migrate from the carrier or fluid. The electrically-driven apparatus can utilize one or more components that segregate the target species during migration and/or inhibit the return or reverse process. Non-limiting examples of such devices include electrodialysis (ED) devices, including current reversing electrodialysis (EDR) devices, as well as electrodeionization (EDI) devices. The present invention, however, is not limited to one or a combination of such electrically-driven apparatus and may be practiced in other apparatus that provide a motive force that facilitates the preferential migration of one or more target species over other species in the fluid to be treated.

The electrically-driven separation apparatus of the invention typically utilize ion selective membranes to facilitate separation phenomena. In some cases, the selectively permeable membrane can preferentially or selectively allow transport of some species relative to other species. For example, cation selective membranes may be utilized in some compartments of the electrically-driven separation apparatus. In other cases, anion selective membranes may be utilized in one or more compartments. In still other cases, the electrically-driven separation apparatus of the invention may comprise one or more monovalent ion selective membranes to selectively promote transfer of the monovalent cationic or anionic species. Indeed, in some embodiments of the invention, the separation apparatus of the invention may comprise monovalent cation selective membranes and one or more monovalent anion selective membranes, typically in one or more concentrating compartments of the apparatus. Non-limiting examples of commercially available monovalent selective membranes include NEOSEPTA® cation and anion selective membranes from ASTOM Corporation, Tokyo, Japan or Tokuyama Corporation, Tokyo, Japan.

A pressure-driven separation apparatus typically utilizes one or more barriers to inhibit migration of a first species therethrough while allowing penetration of another. The motive force facilitating the separation phenomena typically involve pressurizing fluid to be treated. Non-limiting examples of pressure-driven separation apparatus include microfiltration and nanofiltration (NF) apparatus as well as reverse osmosis (RO) systems.

One or more embodiments of the invention can be directed to a water treatment system 100 as exemplarily shown in FIG. 1. System 100 can be a system for providing potable water, irrigation water, or both, to, for example, a point of use 114. The treatment system 100 can comprise at least one separation unit operation or separation apparatus 110 that, in some cases, selectively removes one or more species or types of species from the source 102 of water to be treated. The system can optionally comprise one or more monitoring subsystems that provide an indication of one or more operating characteristics of the treatment system. As illustrated, system 100 can have one or more monitoring sensors 108 that typically provide an indication of water quality produced, or otherwise treated, from the separation apparatus 110. In some aspects of the present invention, system 100 can utilize a control system or controller configured or constructed and arranged to regulate one or more parameters of one or more unit operations in the systems of the invention. Referring again to FIG. 1, system 100 can thus have one or more controllers 106 that adjust at least one operating parameter of separation apparatus 110 typically to at least one desired condition. The one or more monitoring sensors 108 may communicate with the one or more controllers 106 though a communications network including, for example, a signal line 122. The one or more controllers 106 may communicate with the at least one separation unit operation or separation apparatus 110 though a communications network including, for example, a signal line 124. Any suitable control technique may be utilized to adjust the at least one operating parameter of any unit operation in system 100 to provide treated water having the one or more desired characteristics.

The systems and techniques of the invention may include one or more water distribution systems that facilitate delivery of the treated water to one or more points of use. For example, the distribution system may include an irrigation distribution system that delivers irrigation water to various points of use in an agricultural facility. To facilitate the delivery of the treated water, the distribution system can include one or more storage systems, such as reservoirs, tanks, wells, or other vessels and containers. The irrigation systems of the invention may utilize overhead and/or surface irrigation techniques to convey water to a designated area. The irrigation system components can thus employ non-movable as well as mobile devices.

The one or more storage systems may be considered as part of the distribution system or be an ancillary subsystem of the treatment system. The one or more storage systems may further facilitate providing treated water having desired characteristics. For example, treated water having a first condition or characteristic may be stored in one or more storage companions prior to further treatment or processing, for example, blending, with another treated or untreated water body or stream.

Figure 2:
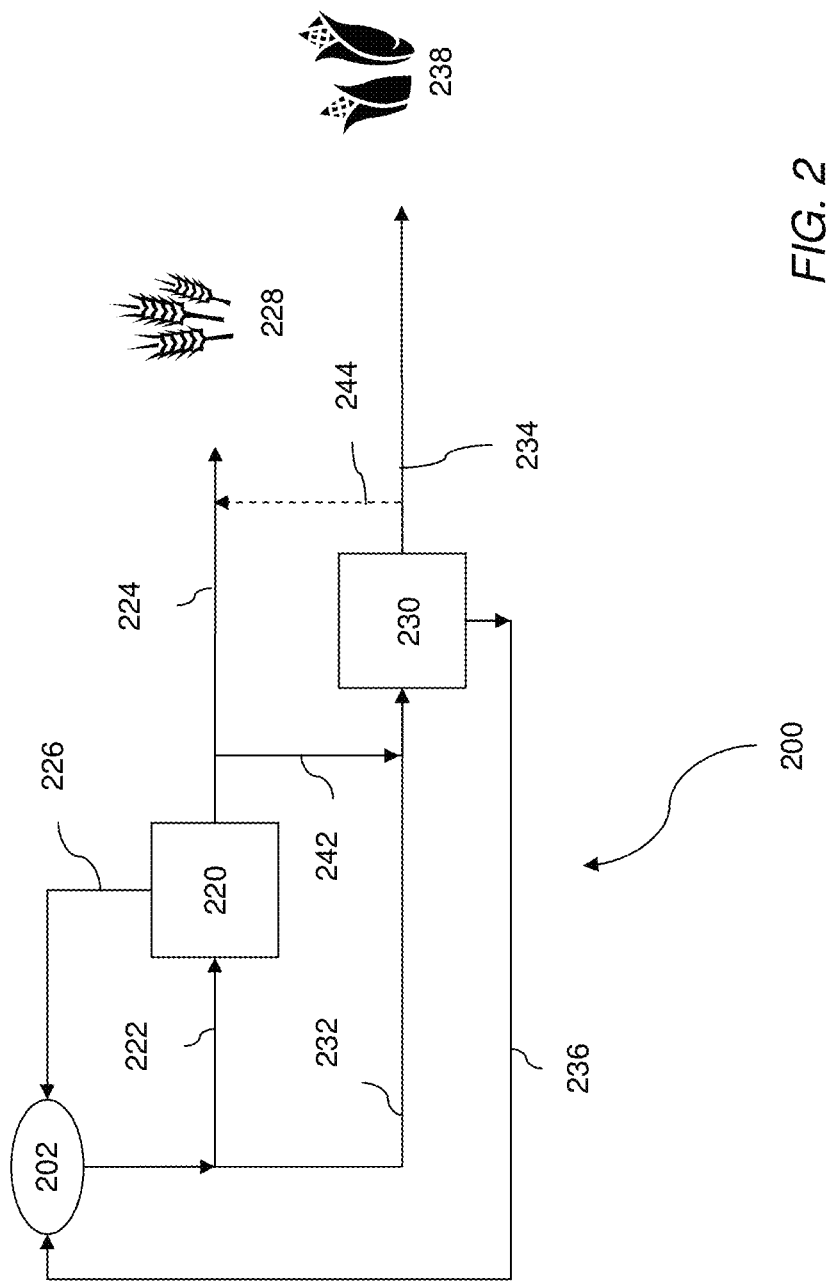
FIG. 2 is a schematic illustration of an irrigation system in accordance with further features of the invention.

FIG. 2 is a schematic diagram exemplarily showing some features of the invention pertinent to an irrigation system 200. Irrigation system 200 can comprise a separation apparatus 220 fluidly connected and, as illustrated, disposed to receive water to be treated from source 202, for example, through conduit 222. Separation apparatus 220 can treat water from source 202 and provide treated water to a first point of use 228, illustrated herein as a first type of crop through irrigation water distribution system 224. Point of use 228 can be a portion of a crop that, for example, is at a stage of growth different from at least one portion of the entire crop. System 200 can further comprise one or more second separation apparatus 230. Separation apparatus 230 can also treat water from source 202 and provide treated water to a second point of use 238, illustrated as a second type of crop, through second irrigation distribution system 234. Second point of use 238 may be a portion the same type of crop to be irrigated as, for example, first point of use 228 or a portion of a second crop at a different stage of growth. In accordance with some embodiments of the invention, separation apparatus 230 can optionally provide treated water to first point of use 228, instead of and/or to supplement treated water from separation apparatus 220, through conduit or connection 244. Some embodiments of the invention contemplate, at least partially, a staged treatment scheme. For example, first separation apparatus 220 may provide treated water having a first water quality or characteristic which can further be treated in second separation apparatus 230 through conduit or distribution system 242. A plurality of second separation apparatus 230 may be utilized with one or more first separation apparatus 220 to provide treated water to one or more points of use. Some embodiments of the invention may involve serial arrangement of separation apparatus and other embodiments may utilize separation apparatus in parallel configurations to provide treated water so as to satisfy the volumetric requirements of the one or more points of use. For example, water to be treated from source 202 may be provided in parallel to both first separation apparatus 220 and second separation apparatus 230 through conduits or distribution systems 222 and 232, respectively. In some cases, however, a combination of serial and parallel treatment paths may be implemented to provide treated water at a rate or a plurality of rates, wherein each of the one or more treated water streams have one or more desired characteristics.

System 200 can include one or more controllers (not shown) to control one or more operating parameters of any component or subsystem of system 200. Like the system exemplarily illustrated in FIG. 1, system 200 can have one or more controllers that can adjust one or more operating parameters. For example, one or more controllers of system 200 can have adjust the current, potential, or both, of the applied electric field in any of the separation apparatus. Other parameters that may be adjusted include, for example, TDS content, pressure, temperature, pH, flow ratio or any combination, of any stream of the system.

In accordance with some aspects of the invention, the one or more characteristics of the treated water stream can be any measured or derived attribute of the product stream so as to render it suitable for its intended use at point 114. However, the invention is not limited as such; for example, the characteristic of the water may be an attribute of the treated or product water stream in terms relative to the water stream to be treated. The attribute or parameter can be a singular or a composite or aggregate characteristic of the water. Specific, non-limiting examples of such attributes can include the conductivity or resistivity of the water, the presence, absence, or concentration of one more particular species or kinds of species in the water, as well as combinations thereof.

In accordance with one or more embodiments of the invention, the systems and techniques of the invention provide water having a desired water attribute can be represented or quantified as a composite character. The composite character can provide an indication of suitability of the treated water for a particular purpose. Consequently, the systems and techniques of the invention can involve operations that seek or at least promote providing water having one or more desired composite characteristics. In irrigation applications, the treated water attribute can be related to its suitability as irrigation water. Thus, some aspects of the invention can be directed to treating non-potable water and rendering the water, as treated water, suitable for irrigation in one or more agricultural facilities by adjusting one or more characteristics thereof. Some aspects of the invention can provide irrigation water tailored to one or more crops grown or cultivated in one or more agricultural facilities. For example, with reference again to FIG. 2, the systems and techniques of the invention can provide a first treated water, having a first composite characteristic, to a first type of crop 228 and a second treated water, having a second composite characteristic, to a second type of crop 238. The second treated water can be used to supplement and/or adjust the characteristic of the first treated water and, conversely, the first treated water can be used to adjust one or more characteristics of the second treated water. The one or more characteristics can be adjusted to meet a particular requirement by, for example, mixing together or blending the one or more treated water streams. The particular target characteristic can be achieved by regulating the ratios or relative amounts or rates of the treated water streams to be mixed.

During typical operation, each of the one or more separation apparatus 220 and 230 typically generates one or more secondary streams. Typically, the one or more secondary streams contain an unacceptable level of one or more undesirable species. Any one or more secondary streams can be discharged as waste streams. For example, the waste stream typically containing the one or more species transferred from the stream treated in separation apparatus 230 can be discharged or transferred to the source of water to be treated 202 through conduit or distribution system 236. The waste stream typically containing the one or more species transferred from the stream treated in separation apparatus 220 can be discharged or transferred to the source of water to be treated 202 through conduit or distribution system 226. Likewise, other embodiments of the invention contemplate combining one or more secondary streams, typically from one or more downstream separation apparatus, with a water stream to be treated in one or more upstream separation apparatus. The waste stream can also be discharged with other streams that may or may not be directly associated with the treatment system. For example, the stream to be discharged may be returned to the source of water to be treated after being mixed with one or more blow down streams from, for example, a cooling tower, which may not be a unit operation of the treatment system. In other cases, however, the one or more waste streams may be stored and combined with water having very low salinity to mitigate water infiltration problems that could result in leaching soluble minerals, and salts such as calcium from surface soils.

In some embodiments of the invention, the secondary stream from second separation apparatus 230 contained in conduit 236 can be introduced into first separation apparatus 220, alone or combined, as shown in FIG. 2, with water to be treated from source 202 as delivered through conduit 222.

The schematically illustrated systems depicted in FIGS. 1 and 2 may further comprise unit operations that facilitate the treatment of water. For example, an optional system may be utilized upstream of separation apparatus 220 and 230 to filter or otherwise remove at least a portion of suspended solids in the water from source 202. Non-limiting examples of pre-treatment unit operations that may be utilized to reduce the concentration of at least one suspended solid entrained in the water to be treated include microfilters, settlers, and coarse particle filters.

Further, one or more unit operations may be utilized to further process one or more of the treated water streams. For example, a polishing bed may further remove one or more species from one or more of the treated streams in distribution systems 224 and 234. Non-limiting examples of such unit operations that can be utilized to remove at least a portion of weakly ionized or ionizable species, such as, but not limited to, boron, selenite, and arsenic, include ion exchange columns.

Further unit operations that facilitate post-treatment of one or more treated water streams of the invention include those that add or otherwise adjust a concentration of one or more desirable species or characteristics of the water stream. Post-treatment operations may be employed to render the one or more waste streams suitable for discharge to the environment.

Accordingly, a mixer may be disposed downstream of one or more separation apparatus of the invention that facilitates incorporation of another treated or untreated water stream, disinfectants, nutrients, and/or desirable salts from one or more sources of such. In accordance with some embodiments of the invention, one or more sources of a salt can be disposed to be introduced into the treated water stream. For example, a separation apparatus may be utilized in the treatment or irrigation system of the invention that selectively removes or reduces the concentration of divalent or other non-monovalent species from a water stream to be treated. Such an optional apparatus would typically provide at least one product stream having a relatively high concentration of non-monovalent species which can be introduced to the treated stream to adjust at least one characteristic thereof so as to provide a stream or body of water with a target or desirable condition. Examples of systems and techniques that advantageously provide beneficial species-rich streams include those disclosed in co-owned U.S. Pat. No. 7,820,024, titled "Electrically-Driven Separation Apparatus," the substance of which is incorporated herein by reference. In some cases, however, one or more otherwise unconnected or distinct sources of, for example, calcium and/or magnesium salts, may be utilized to adjust one or more characteristics of the treated water stream prior to its use. Additionally, one or more intrinsic and/or extrinsic properties of the water stream may be further adjusted. For example, the water stream may be cooled or heated to adjust the temperature thereof. The pH of the water stream or body may also be adjusted by, for example, adding one or more acids or bases, to achieve a desired pH value. The desired property or characteristic may be dependent on a plurality of factors including, for example, the pH of the soil to be irrigated, the salt tolerance the crops to be irrigated and, in some cases, the moisture content of the soil. Thus, some features of the invention provide further capabilities directed to achieving one or more desired composite characteristics.

The further adjustment of the one or more properties or characteristics may be performed after treatment in the separation apparatus, prior to use or introduction to the point of use, or during storage of the treated water in one or more reservoirs.

However, some aspects of the invention contemplate beneficial or economically attractive attributes of such secondary streams containing high concentrations of one or more dissolved species, relative to the first or treated product stream and/or the stream introduced into the separation apparatus. For example, the secondary product stream may contain high dissolved solids and can serve as a feed stream that may be further processed to obtain additional products or at least provide a product stream having a high concentration of a desirable species.

One or more characteristics of the water utilized in some systems and techniques of the invention can provide an indication of the suitability of the water for agricultural use. For example, the one or more characteristics of the water can be represented as the salinity, as total dissolved salts or solids content, and/or electrical conductivity, as well as or in conjunction with any of the alkalinity, iron content, and pH of the water. In some cases, the level of salinity of the water can become a selective parameter when considered relative to the type of crops to be irrigated by the at least partially treated water. Thus, in accordance with some aspects of the invention, the salinity of the water may be used as a factor to consider when making a determination whether to adjust at least one operating parameter of the systems of the invention. In other embodiments of the system and techniques of the invention, the characteristic value can be represented as a ratio of the concentration of species that tends to render soil as water-impermeable relative to the concentration of species that tends to render soil as aggregating or water-adsorbing.

In accordance with some aspects of the invention, the characteristic value can provide an indication of the suitability of the water for irrigation purposes, for human consumption, and/or for livestock or poultry use. In some embodiments, the characteristic value of a water stream or body can be represented as a ratio of the concentration of monovalent species relative to the concentration of divalent species in the water. For example, the characteristic value can be at least partially expressed as the sodium adsorption ratio (SAR) or exchangeable sodium percentage. Preferably, the SAR value of a stream or body of water can provide an indication as to whether the water may be suitable to irrigate a type or kind of crop. Thus, in accordance with some aspects of the invention, some embodiments thereof relate to systems and techniques that can involve controlling one or more operating parameters based at least partially on a desired characteristic value that is at least partially derived from at least one requirement of a point of use. Where the point of use is, for example, a crop to be irrigated, the desired characteristic value can be based on the salt tolerance of the crop and/or one or more attributes or characteristics of the soil.

The sodium adsorption ratio value is typically determined according to the formula (1), $$SAR = \frac{[Na]}{\sqrt{[Ca]+[Mg]}}$$

where [Na] is the sodium species concentration, in mol/m$^3$, in the water, [Ca] is the calcium species concentration, in mol/m$^3$, in the water, and [Mg] is the magnesium species concentration, in mol/m$^3$, in the water. Other characteristic values of the water may be utilized, alone or in conjunction with the SAR value. Thus, in some cases, the characteristic value of the water that can serve as indication of water quality or suitability for its intended purpose involves the total dissolved solids concentration in the water, the pH, and/or the concentration of one or more toxic or hazardous species.

Adjusting the SAR value of the, for example, irrigation water, may be effected by adjusting one or more operating parameters of the water system. For example, the relative ratio of treated water having various associated SAR values may be adjusted to provide a composite or blended mixture of product water having the desired SAR value. Other techniques including reducing the flow rate of the water stream through the one or more separation apparatus or increasing the residence or treatment period can facilitate achieving the desired SAR value. In addition or in conjunction with such techniques, adjusting the applied potential or pressure level through, for example, the electrically-driven or pressure-driven separation apparatus can also facilitate providing treated water having the one or more desired characteristics.

Embodiments of systems of the invention may desalinate seawater and/or brackish water to provide irrigation water that avoids or reduces the extent of any soil permeability and/or infiltration problems.

The one or more characteristic values of the treated water may be a relative correlation between species contained in the water. For example, the characteristic value may be a ratio of dissolved sodium species to dissolved calcium. A preferred desirable sodium to calcium ratio of not more than about 3:1 may avoid or reduce the likelihood of water infiltration problems due to soil dispersion and plugging and soil surface pore sealing. Further, some embodiments of the invention can selectively reduce the concentration of monovalent sodium in irrigation water, so that a source of relatively calcium-rich water can be provided to counteract any sodium-dispersing phenomena in irrigation.

The product water can have an SAR value in a range from about 2 to about 8. The target or desirable SAR value may, however, depend on one or more factors in the agricultural facility. For example, the target SAR value depend on the type of crops grown in the facility, the stage of growth of one or more crops in the facility, and the soil conditions including the water infiltration rate, sodicity, and/or alkalinity of the soil. Particular guidelines that may be used to provide one or more target characteristics of irrigation water include those provided by The Food and Agriculture Organization of the United Nations (FAO). For example, the exchangeable sodium level, which can be correlated to the SAR value, can serve as a desirable characteristic value of water utilized for irrigation purposes. In particular, sensitive crops such as, but not limited to fruits, nuts, and citrus typically require irrigation water having an SAR value of up to about 8; other sensitive crops such as beans may tolerate irrigation water having an SAR value of up to about 18; moderately tolerant crops such as clover, oats, and rice may tolerate irrigation water having an SAR value of up to about 18 to 46; and tolerant crops such as, but not limited to wheat, barley, tomato, beets, and tall wheat grass, may tolerate irrigation water having an SAR value of up to about 46 to 102.

Figure 7:
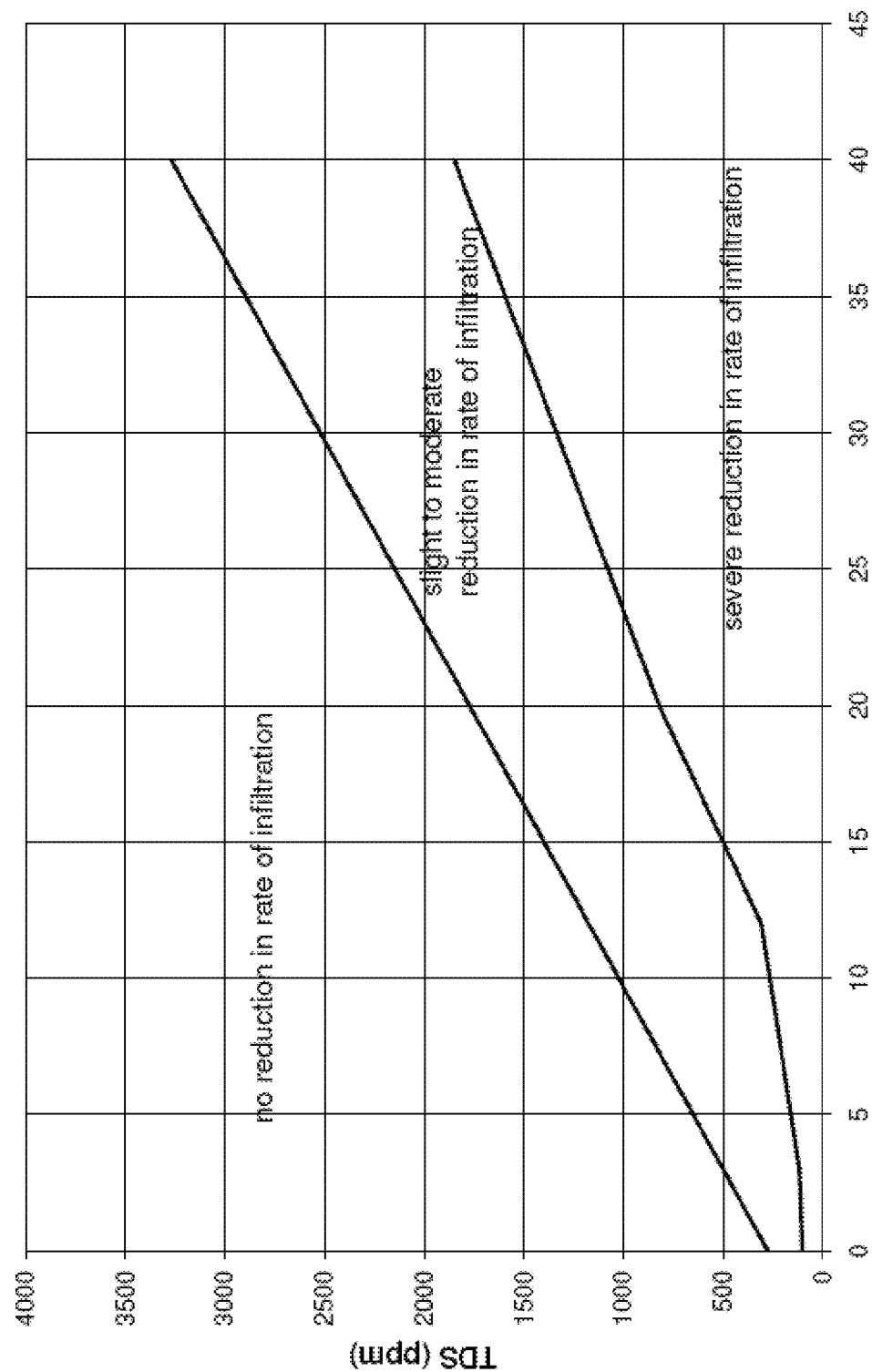
FIG. 7 is a graph showing representative ranges of acceptable levels of water characteristics in accordance with some aspects of the invention.

Infiltration issues typically arise when irrigation water does not enter the soil and becomes unavailable to crops. In contrast to salinity issues, which reduce the availability of water, infiltration problems can effectively reduce the quantity of water available for crop use. Water infiltration can increase with increasing salinity and can decrease with decreasing salinity or increasing sodium content relative to calcium and magnesium. Further, low salinity water having, for example, a conductivity of less than about 0.5 dS/m, is typically corrosive and tends to leach surface soil of soluble minerals and salts, such as calcium, which in turn can reduce soil aggregation and structure. Soil without or having low salt content tends to be dispersive as fine soil particles which fill pore spaces, effectively sealing the soil surface and reducing the rate of water infiltration. The soil would tend to form a crust which reduces the amount of water entering the subsurface and can also prevent crop emergence. Thus, in some embodiments of the invention, the desired water quality may be further based on the salinity of the irrigation water. For example, FIG. 7, which is based on a publication by Ayers, R. S. and Westcot, D. W., titled "Water Quality for Agriculture," FAO Irrigation and Drainage Paper 29 rev. 1, Food and Agriculture Organization of the United Nations, 1989, 1994, and which shows the influence of salinity, as represented by TDS concentration, and SAR on infiltration, can conjunctively provide desirable salinity levels and SAR values of irrigation water that reduces or avoids infiltration problems. In FIG. 7, seawater properties were used to derive TDS concentration values from electrical conductivity data from the above reference. In particular, the correlations between the density and salinity and between the salinity and electrical conductivity of seawater at 20° C. were determined based on published physical properties. These correlations were then used to convert the electrical conductivity values of seawater from the above-identified reference into the corresponding TDS concentration, which were then mapped relative to the corresponding SAR values to obtain the infiltration guidelines presented in FIG. 7.

Further embodiments of the invention may also provide suitable irrigation water when it has a composite characteristic value such as having an SAR value of less than about 8 while having a TDS level of about 1,500 ppm or more.

Some embodiments of the invention can provide desalination systems and techniques that selectively remove undesirable species which contrasts to non-selective desalination techniques such as those based on thermal and pressure-driven processes. Further, some systems and techniques of the invention can provide a product water stream without requiring the further addition of preferred species. For example, embodiments of the invention can provide irrigation water that does not involve further adjusting characteristic values by the addition of supplemental species.

Figure 3:
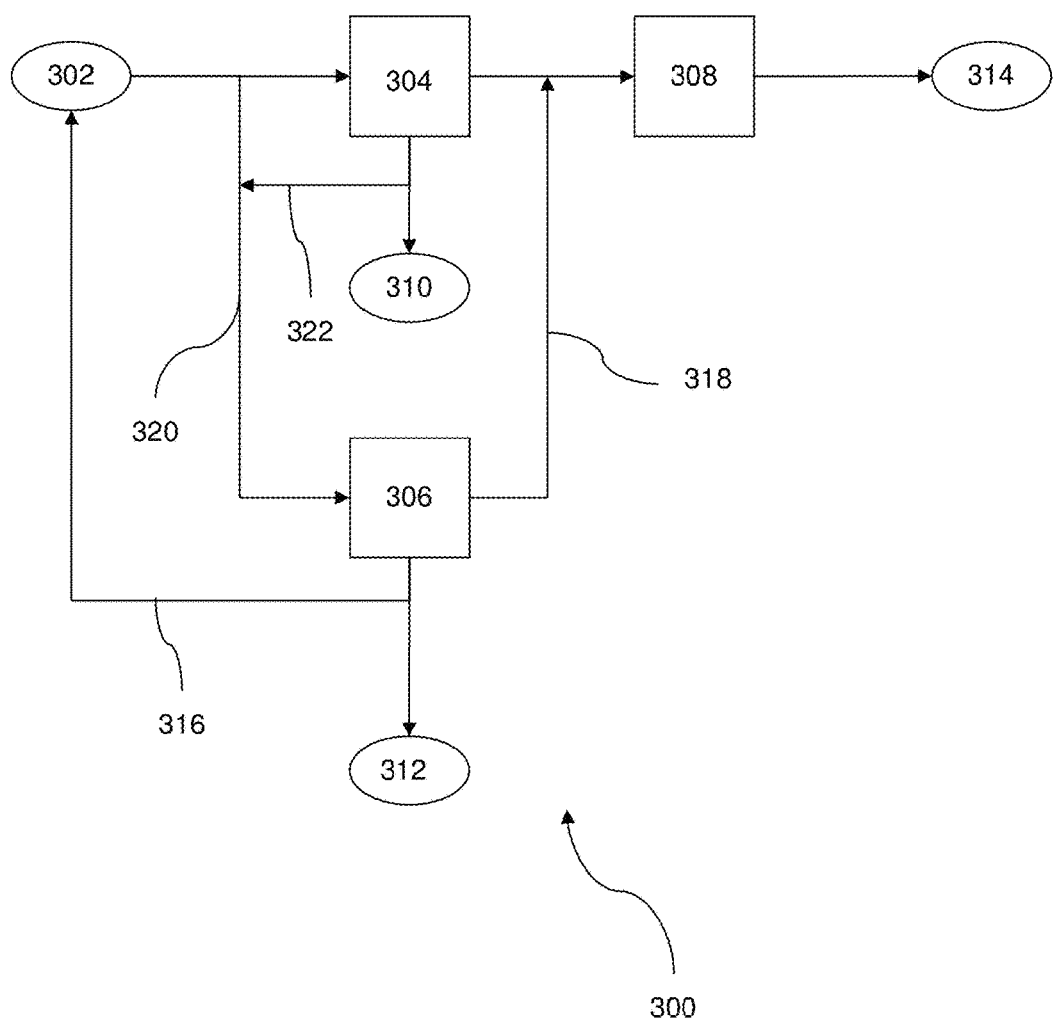
FIG. 3 is a schematic illustration of another system in accordance with further features of the invention.

Further features and aspects of the invention are illustrated in FIG. 3. The treatment system 300 exemplarily illustrated can comprise a first separation apparatus 304 and a second separation apparatus 306. Separation apparatus 304 and 306 typically treat a fluid from one or more sources 302. The water to be treated from source 302 typically contains a high or unacceptable level of dissolved species. The one or more separation apparatus can thus be utilized to at least partially remove or reduce the concentration of one or more undesirable species from the water. The water to be treated from source 302 may be supplied in parallel to both the first separation apparatus 304, and the second separation apparatus 306 through, for example, distribution system or conduit 320. As exemplarily illustrated, treated water from separation apparatus 304 can be combined with treated water from separation apparatus 306 delivered through, for example, distribution system or conduit 318, in one or more mixing operations or mixer 308 to provide a treated water stream having desired properties and/or characteristics to point of use 314. In accordance with some embodiments of the invention, the treated water may be rendered suitable to be used as potable and/or bathing water in one or more points of use 314.

First separation apparatus 304 may be an electrically-driven separation apparatus or a pressure-driven separation apparatus. Likewise, second separation apparatus 306 may be an electrically-driven separation apparatus or a pressure-driven separation apparatus. In accordance with some aspects of the invention, separation apparatus 304 removes at least a portion of a plurality of undesirable species in water to be treated from source 302. In some cases, first separation apparatus can indiscriminately remove at least a portion of a plurality of undesirable species from the water to be treated. For example, the first separation apparatus can utilize RO and/or NF based techniques to remove, typically without preference or selectivity, at least a portion of any undesirable species. The treated water stream resulting from the pressure-driven separation apparatus preferably exceeds potable water quality requirements.

The second separation apparatus can remove one or more undesirable species from the water stream to be treated. In some cases, the separation apparatus selectively removes at least a portion of one or more undesirable species from the water to produce a product water stream. If the product water stream from the second separation apparatus fails to meet or exceed potable water quality requirements, a portion of the treated water from the first separation apparatus that exceeds the potable water quality requirements may be incorporated or blended therewith. For example, where the first separation apparatus provides product water having a TDS level of about 250 mg/L and the second separation apparatus provides product water having a TDS level of about 1,000 mg/L, the product water streams can be combined in a volumetric ratio of about 2:1 to produce a blended product having a TDS level of about 500 mg/L. The target level may be a concentration that meets or exceeds one or more guidelines suggested by the World Health Organization for potable water in, for example, the WHO Guidelines for drinking-water quality, fourth edition, World Health Organization 2011. Other water streams may also be blended with one or more products streams of the separation apparatus of the invention to provide drinking and/or bathing water that meet or exceed guidelines or requirements typically set by government regulatory organizations.

One or more reject streams from the first separation apparatus, typically containing relative high levels of species removed from the first treated product stream may be discharged to drain, directed to one or more ancillary points of use 310, or returned to source 302. Further embodiments of the invention contemplate combining the reject water stream with water from source 302 through conduit 322 so as to be treated in the second separation apparatus. A secondary or reject water stream from second separation apparatus may also be discharged to a drain, directed to one or more ancillary points of use 310 and/or 312, returned to source 302 as shown through conduit 316.

Figure 4:
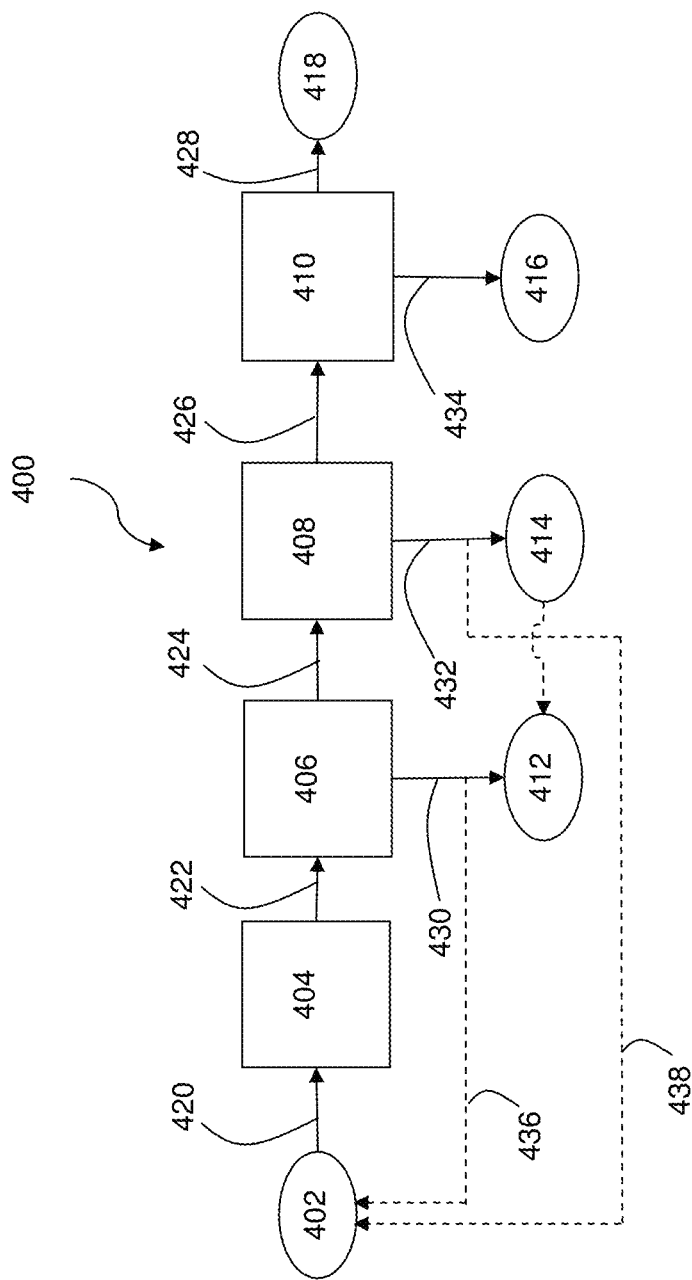
FIG. 4 is a schematic illustration of another system in accordance with further features of the invention.

Further features and aspects of the invention are illustrated in FIG. 4. The treatment system 400 exemplarily illustrated includes a first separation apparatus 406, a second separation apparatus 408, and a third separation apparatus 410. The first separation apparatus 406 may be supplied with water to be treated from a source 402 of water to be treated which may include, for example, seawater or brackish water. The water to be treated may be supplied though a distribution system or conduit 420 to a pre-filter 404, and then through a distribution system or conduit 422 to the first separation apparatus 406. Non-limiting examples of pre-treatment unit operations that may be utilized in pre-filter 404 which may reduce the concentration of at least one suspended solid entrained in the water to be treated include microfilters, settlers, and coarse particle filters.

The first separation apparatus 406 may remove a large fraction of contaminants from the water to be treated to produce a first diluent stream. The contaminants removed may include one or more ionic species. The first separation apparatus 406 may remove, for example, about 80% of sodium chloride and potassium chloride from the water supplied through distribution system or conduit 422. The first diluent stream from the first separation apparatus 406 may be supplied to distribution system or conduit 424. The first separation apparatus 406 may also produce a concentrate. Concentrate from the first separation apparatus 406 may be carried through a distribution system or conduit 430 as a waste stream which may be discharged to drain, directed to one or more ancillary points of use 412, for example, for use in the electrochemical production of chlorine or alkali, or returned to the source 402, through, for example, distribution system or conduit 436. The first separation apparatus 406 may operate at very high water recoveries, for example, between about 20% and about 60% or more because monovalent ions may be present in the concentrate delivered through distribution system or conduit 430 at high concentrations without precipitation. The pre-filter 404 and sizing of the intake equipment may be relatively small compared to systems with lower water recoveries, thereby saving capital costs.

The partially desalinated water output as the first diluate stream from the first separation apparatus 406 may remain unacceptably high in monovalent salts and/or high in divalent salts, for example, calcium sulfates and/or magnesium sulfates for some uses. The first diluate stream may thus be further treated in a second separation apparatus 408. The second separation apparatus 408 may remove a large fraction, for example, between about 50% and about 95% of remaining monovalent ions from the influent diluate from the first separation apparatus 406 and produce a second diluate stream with a very low concentration, for example, less than about 1,000 mg/L (1,000 ppm) of monovalent ionic contaminants. This second diluate stream may be output into distribution system or conduit 426. The second separation apparatus 408 may also produce a concentrate. Concentrate from the second separation apparatus may be carried through a distribution system or conduit 432 as a waste stream which may be combined with the concentrate from the first separation apparatus at point of use 412, and/or discharged to drain, directed to one or more ancillary points of use 414, or returned to the source 402, through, for example, conduit or distribution system 438.

Diluate from the second separation apparatus 408 may be conveyed through a distribution system or conduit 426 to a third separation apparatus 410. The third separation apparatus 410 may produce a filtrate suitable for potable use and a retentate. To be suitable for potable use, the filtrate may have characteristics defined in recognizable standards, for example, those provided by the WHO noted above. The filtrate from the third separation apparatus 410 may include, for example, a TDS level of less than about 500 ppm, low amounts of divalent ions, low amount of metals and trace elements, low levels of particulates and/or colloidal or microbiological impurities, and/or a low organic content. The characteristics of the filtrate from the third separation apparatus 410 may meet regulatory requirements for potable water in a jurisdiction in which the system 400 is operated. The filtrate from the third separation apparatus 410 may be output through distribution system or conduit 428 to a point of use 418. A retentate from the third separation apparatus 410 may be high in divalent ions and may be suitable for agricultural use. To be suitable for agricultural use, the retentate from the third separation apparatus 410 may have a SAR value of, for example, less than about 20, less than about 18, less than about 9, less than about 8, or less than about 3, and may have a TDS value of less than about 3,500 ppm and/or greater than about 1,500 ppm. The retentate from the third separation apparatus 410 may be output through a distribution system or conduit 434 to a point of use 416.

The first separation apparatus 406 may include an electrically-driven separation apparatus. The first separation apparatus 406 may include one or more monovalent ion selective membranes to selectively promote transfer of one or more monovalent cationic and/or anionic species. In some embodiments, the first separation apparatus 406 may comprise one or more monovalent cation selective membranes and one or more monovalent anion selective membranes, typically in one or more concentrating compartments of the apparatus. The first separation apparatus 406 may include an electrodialysis system.

Because the nature of electrodialysis is that power costs are inversely related to the level of salinity in water to be treated, high concentrations of ionic contaminants in the water to be treated may reduce power losses in the electrodialysis equipment (albeit at some expense of thermodynamic efficiency.)

The second separation apparatus 408 may include an electrically-driven separation apparatus. The second separation apparatus 408 may, like the first separation apparatus 406, include one or more monovalent ion selective membranes to selectively promote transfer of one or more monovalent cationic or anionic species. The second separation apparatus 408 may include an electrodeionization system.

The third separation apparatus may include a pressure-driven separation apparatus. The third separation apparatus 410 may include a filtration membrane selected to effectively remove contaminants including divalent ionic species from the diluate from the second separation apparatus 408. The third separation apparatus 410 may include a water softening membrane.

Figure 5:
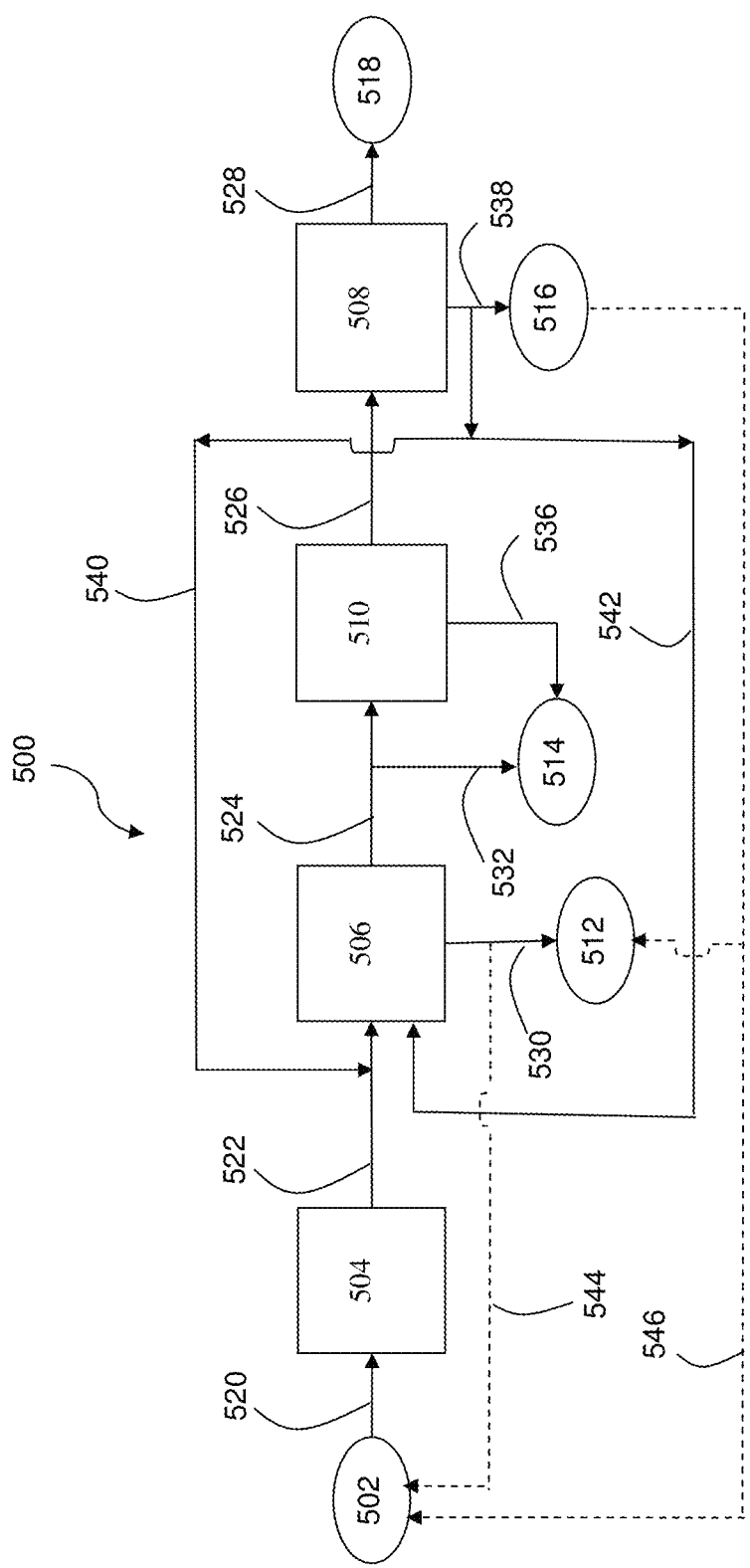
FIG. 5 is a schematic illustration of another system in accordance with further features of the invention.

In another embodiment, indicated generally at 500 in FIG. 5, a treatment system may include a source of water to be treated 502 which may include, for example, seawater or brackish water in fluid communication through a distribution system or conduit 520 to a pre-filtration system 504. The pre-filtration system 504 may be in fluid communication through a distribution system or conduit 522 to a first separation apparatus 506. The first separation apparatus 506 may produce a diluate which may be acceptable for agricultural use without further treatment and a concentrate. The diluate from the first separation apparatus 506 may have similar characteristics as the retentate from the third separation apparatus 410 of FIG. 4 described above.

A first portion of the diluate from the first separation apparatus 506 may be directed through a distribution system or conduit 524 and a distribution system or conduit 532 to a point of use 514 for agricultural use. A second portion of the diluate from the first separation apparatus 506 may be directed through the distribution system or conduit 524 to a second separation apparatus 510. The relative amounts of the diluate from the first separation apparatus 506 directed to point of use 514 and to the second separation apparatus 510 may be selected in any amount in a range of from about 0% to about 100% as desired. A diverting valve (not shown) may be utilized to vary the amount of diluate from the first separation apparatus 506 directed to point of use 514 and to the second separation apparatus 510 as desired.

Concentrate from the first separation apparatus 506 may be carried through a distribution system or conduit 530 as a waste stream which may be discharged to drain, directed to one or more ancillary points of use 512, for example, for use in the electrochemical production of chlorine or alkali, or returned to the source 502, through, for example, distribution system or conduit 544.

The second separation apparatus 510 may treat water provided through the distribution system or conduit 524 to produce a filtrate and a retentate. Retentate from the second separation apparatus 510 may be directed through distribution system or conduit 536 to point of use 514 where it may be combined with the first portion of the diluate from the first separation apparatus 506 for agricultural use.

Filtrate from the second separation apparatus 510, which may be low in divalent ionic contaminants and/or particulates and/or microbial contaminants, may be directed through a distribution system or conduit 526 to a third separation apparatus 508. The filtrate may have characteristics defined in recognizable standards, for example, those provided by the WHO noted above.

The third separation apparatus 508 may treat water provided through the distribution system or conduit 526 to produce a diluate and a concentrate. Diluate from the third separation apparatus 508 may be suitable for potable use, and may have similar characteristics as the filtrate from the third separation apparatus 410 described above with reference to FIG. 4. Diluate from the third separation apparatus 508 may be directed through a distribution system or conduit 528 to a point of use 518. Concentrate from the third separation apparatus 508 may be carried through a distribution system or conduit 538 as a waste stream which may be discharged to drain, directed to one or more ancillary points of use 516, for example, for use in the electrochemical production of chlorine or alkali, or returned to the source 502, through, for example, distribution system or conduit 546 and/or combined with concentrate from the first separation apparatus 506 at point of use 512.

In some embodiments a portion of the concentrate from the third separation apparatus 508 may be directed through a distribution system or conduit 540 to be used as diluate makeup for the first separation apparatus 506, or through distribution system or conduit 542 to be used as concentrate makeup for the first separation apparatus 506. The amount or fraction of concentrate from the third separation apparatus 508 utilized as diluate makeup for the first separation apparatus 506, or as concentrate makeup for the first separation apparatus 506 may be selected as desired. The amount of the concentrate from the third separation apparatus used as diluate makeup or concentrate makeup for the first separation apparatus 506 may be selected based on, for example, the quality of the concentrate from the third separation apparatus and the need for the diluate makeup or concentrate makeup. A valve (not shown) may provide for the amount of concentrate from the third separation apparatus 508 utilized as diluate makeup for the first separation apparatus 506, or as concentrate makeup for the first separation apparatus 506 to be adjusted as desired.

The pre-filtration system 504 and first separation apparatus 506 may be similar to the pre-filter 404 and first separation apparatus 406 described above with reference to FIG. 4. The second separation apparatus 510 may include a pressure-driven separation apparatus similar to the third separation apparatus 410 described above with reference to FIG. 4. The third separation apparatus 508 may be an electrically-driven separation apparatus. The third separation apparatus 508 may, like the second separation apparatus 408 described above with reference to FIG. 4, include one or more monovalent ion selective membranes to selectively promote transfer of one or more monovalent cationic or anionic species. The third separation apparatus 508 may include, for example, an electrodeionization system. In other embodiments, the filtrate from the second separation apparatus 510 treated in the third separation apparatus 508 may be sufficiently low in monovalent ions that monovalent ion selective membranes would not be required in the third separation apparatus 508. The third separation apparatus 508 may thus utilize standard electrodeionization membranes known in the art. These standard electrodeionization membranes may be not monovalent ion selective.

Figure 6:
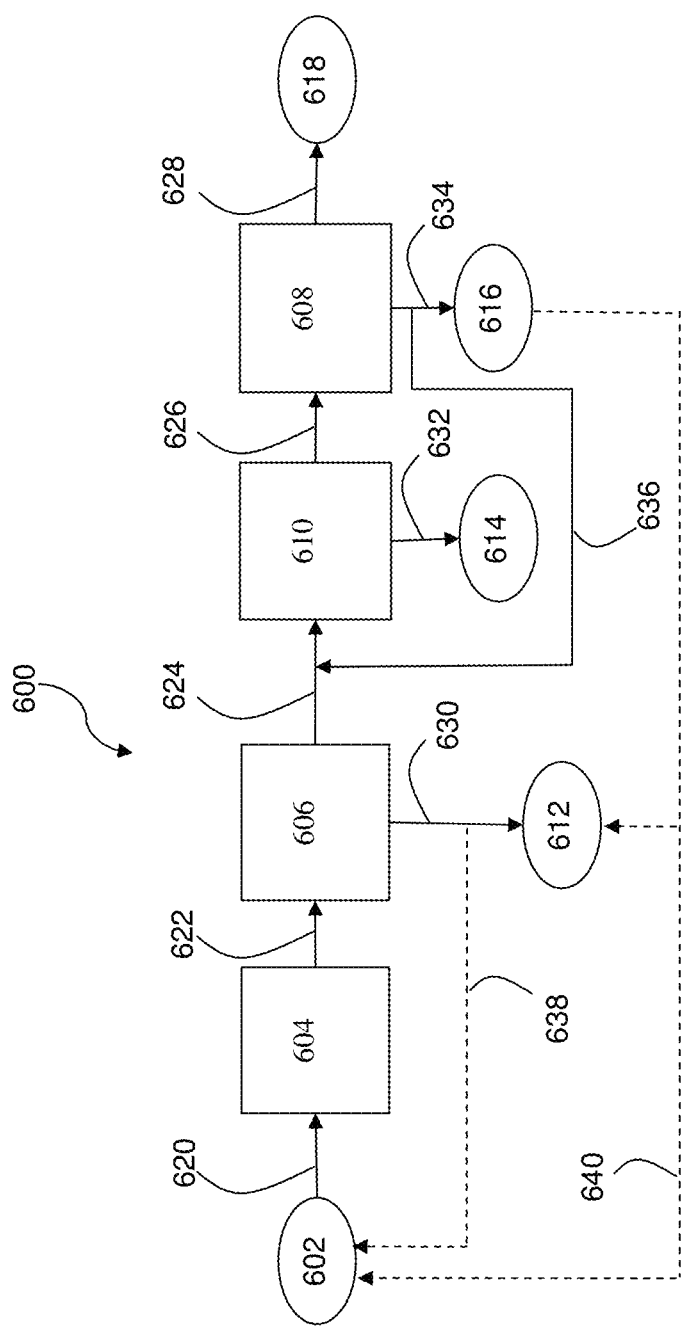
FIG. 6 is a schematic illustration of another system in accordance with further features of the invention.

In another embodiment, indicated generally at 600 in FIG. 6 a treatment system may include a source of water to be treated 602 which may include, for example, seawater or brackish water in fluid communication through a distribution system or conduit 620 to a pre-filtration system 604. The pre-filtration system 604 may be in fluid communication through a distribution system or conduit 622 to a first separation apparatus 606.

The first separation apparatus 606 may treat water provided through the distribution system or conduit 622 to produce a diluate and a concentrate. Diluate from the first separation apparatus 606 may be directed through the distribution system or conduit 624 to a second separation apparatus 610. Concentrate from the first separation apparatus 606 may be carried through a distribution system or conduit 630 as a waste stream which may be discharged to drain, directed to one or more ancillary points of use 612, for example, for use in the electrochemical production of chlorine or alkali, or returned to the source 602 through, for example, distribution system or conduit 638.

The second separation apparatus 610 may treat water provided through the distribution system or conduit 624 to produce a filtrate and a retentate. Retentate from the second separation apparatus 610 may have characteristics, for example, a SAR value and/or TSS level that render it suitable for agricultural use. The retentate from the second separation apparatus 610 may be directed through distribution system or conduit 632 to point of use 614 for agricultural use. Filtrate from the second separation apparatus 610, which may be low in divalent ionic contaminants and/or particulates and/or microbial contaminants may be directed through a distribution system or conduit 626 to a third separation apparatus 608. The filtrate may have characteristics defined in recognizable standards, for example, those provided by the WHO noted above.

The third separation apparatus 608 may treat water provided through the distribution system or conduit 626 to produce a diluate and a concentrate. Diluate from the third separation apparatus 608 may have characteristics making it suitable for potable use, for example, similar characteristics as the filtrate from the third separation apparatus 410 described above with reference to FIG. 4. Diluate from the third separation apparatus 608 may be directed through a distribution system or conduit 628 to a point of use 618 for use as potable water. Concentrate from the third separation apparatus 608 may be carried through a distribution system or conduit 634 as a waste stream which may be discharged to drain, directed to one or more ancillary points of use 616, for example, for use in the electrochemical production of chlorine or alkali, or returned to the source 602, through, for example, distribution system or conduit 640 and/or combined with concentrate from the first separation apparatus 606.

In some embodiments a portion of the concentrate from the third separation apparatus 608 may be directed through a distribution system or conduit 636 as diluate makeup for the second separation apparatus 610. The amount or fraction of concentrate from the third separation apparatus 608 utilized as diluate makeup for the second separation apparatus 610 may range from about 0% to about 100% of the concentrate produced from the second separation apparatus and may adjusted as desired depending on factors such as, for example, one or more characteristics of the concentrate from the third separation apparatus 608 or of the dilute from the first separation apparatus. A valve (not shown) may provide for the amount of concentrate from the third separation apparatus 608 utilized as diluate makeup for the second separation apparatus 610 to be adjusted as desired.

The pre-filtration system 604 and first separation apparatus 606 may be similar to the pre-filter 404 and first separation apparatus 406 described above with reference to FIG. 4. The second separation apparatus 610 may include a pressure-driven separation apparatus similar to the third separation apparatus 410 described above with reference to FIG. 4. The third separation apparatus 608 may be an electrically-driven separation apparatus similar to the third separation apparatus 508 described above with reference to FIG. 5.

It is to be understood that the various features of any of the systems disclosed above may be combined or substituted. For example, the first separation unit 406 of FIG. 4 or the first separation unit 606 of FIG. 6 may be supplied with concentrate from the second separation apparatus 408 or the third separation apparatus 608, respectively as concentrate makeup or as diluate makeup. Concentrate from the third separation apparatus 508 of FIG. 5 may be utilized as makeup water for the second separation apparatus 510 in a similar manner as concentrate from the third separation apparatus 608 of FIG. 6 may be utilized as makeup water for the second separation apparatus 610.

In each of the systems described above, total water recoveries of between about 66% and about 80% or higher may be possible with low processing costs and high energy efficiency, for example, an energy efficiency of about 2.0 kwh/m$^3$ of purified water or less. In some embodiments none of the water purified to a level suitable for agricultural or potable use would need to be used for wastewater makeup. Rather, makeup water for the concentrate or diluate streams for the electrodialysis systems could be made up from downstream electrodeionization or electrodialysis concentrate streams. The provision of this makeup water from these downstream sources may improve the overall electrical efficiency of the disclosed system as compared to systems not including the provision of makeup water as described.

Potable water produced in the above systems may be low in salinity and substantially or completely free of particulates, colloids, or microbes. The potable water may have characteristics defined in recognizable standards, for example, those provided by the WHO noted above. The fraction of purified water produced that is suitable for agricultural use may include high levels of divalent ions and minerals, but have very low concentrations of impurities such as sodium chloride or potassium chloride. The fraction of purified water produced that is suitable for agricultural use may not require processing by softening membranes. Since only a small fraction of the total water influent to the treatment systems described above may be processed by water softening membranes to produce potable water, the size and capital and operational costs of the water softening membrane units may be low relative to other systems where a greater quantity of water would need to be processed through water softening membrane units. Also, in some embodiments, only a small portion of the influent water to be treated would be processed through electrodialysis units including monovalent ion selective membranes or through electrodeionization units, providing further for reduced treatment unit sizes and reduced capital and operational costs.

In some embodiments transport of divalent ions through electrodialysis and/or electrodeionization units including monovalent ion selective membranes may be substantially avoided or eliminated. This may result in a reduced buildup of scale in the electrodialysis and/or electrodeionization units and may reduce pH shifts and high voltages caused by sulfate transport through a typical anion electrodialysis membrane.

Each of the embodiments of treatment systems described above may be used partially within a total system such that combinations of the various embodiments can be used for customized agricultural and potable water production quantities or qualities, depending on the feed water makeup and demand for the water for agricultural or potable uses. The quantities of water suitable for potable or agricultural consumption may be changed based on demand by running more or less water to be treated through each of the various embodiments, changing the relative water recoveries or adjusting based on salinity changes in the water to be treated.

As noted above, ancillary systems may be utilized in the systems and techniques of the invention in post-treatment operations. For example, one or more disinfecting systems such as those that irradiate, oxidize, or otherwise reduce microbiological activity in the water may be disposed to further treat the water. Further, one or more storage systems may be also used as discussed above.

Figure 10:
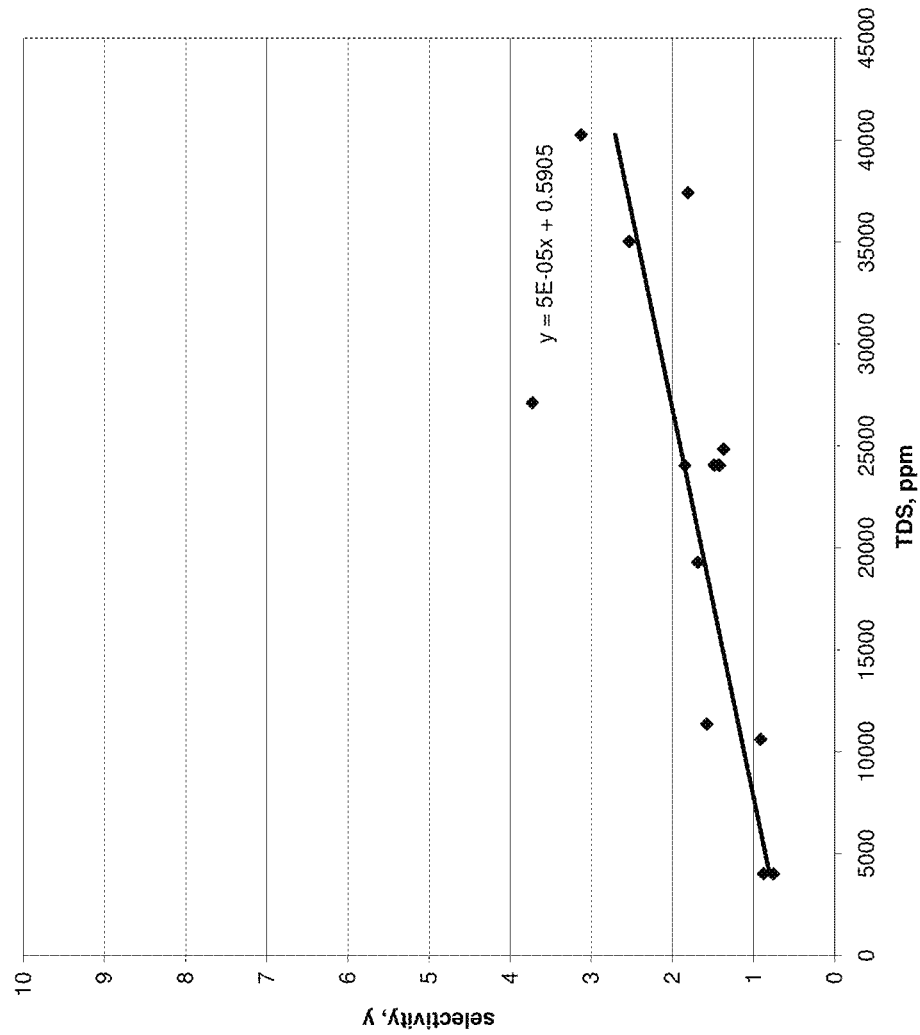
FIG. 10 is a graph showing the influence of membrane selectivity on the total dissolved solids content of the product water treated in an apparatus in accordance with some embodiments of the invention.
Figure 11A:
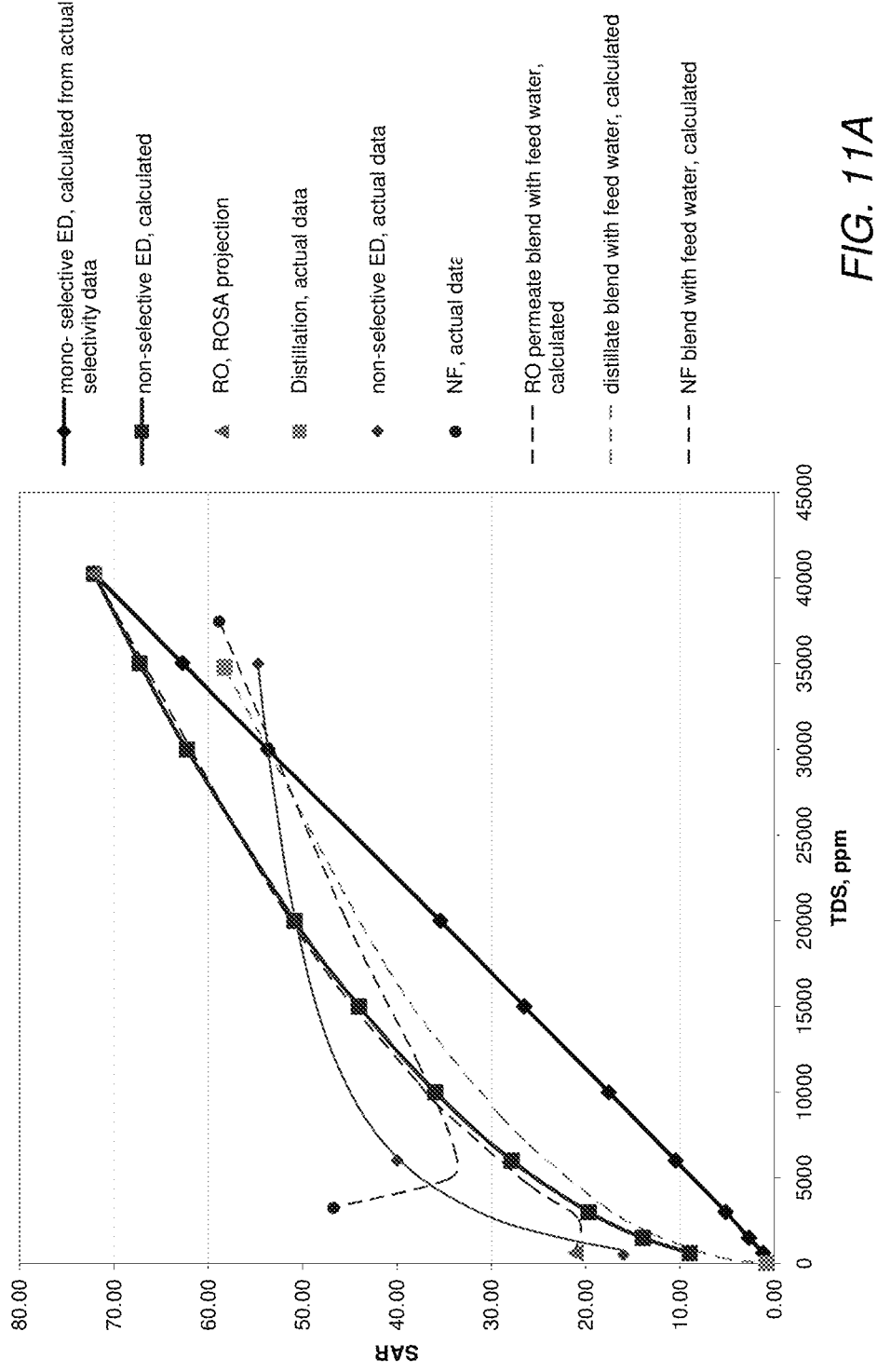
FIGS. 11A and 11B are graphs comparatively illustrating some of the characteristics of treated water produced by systems and techniques of the invention relative to other non-selective processes.
Figure 11B:
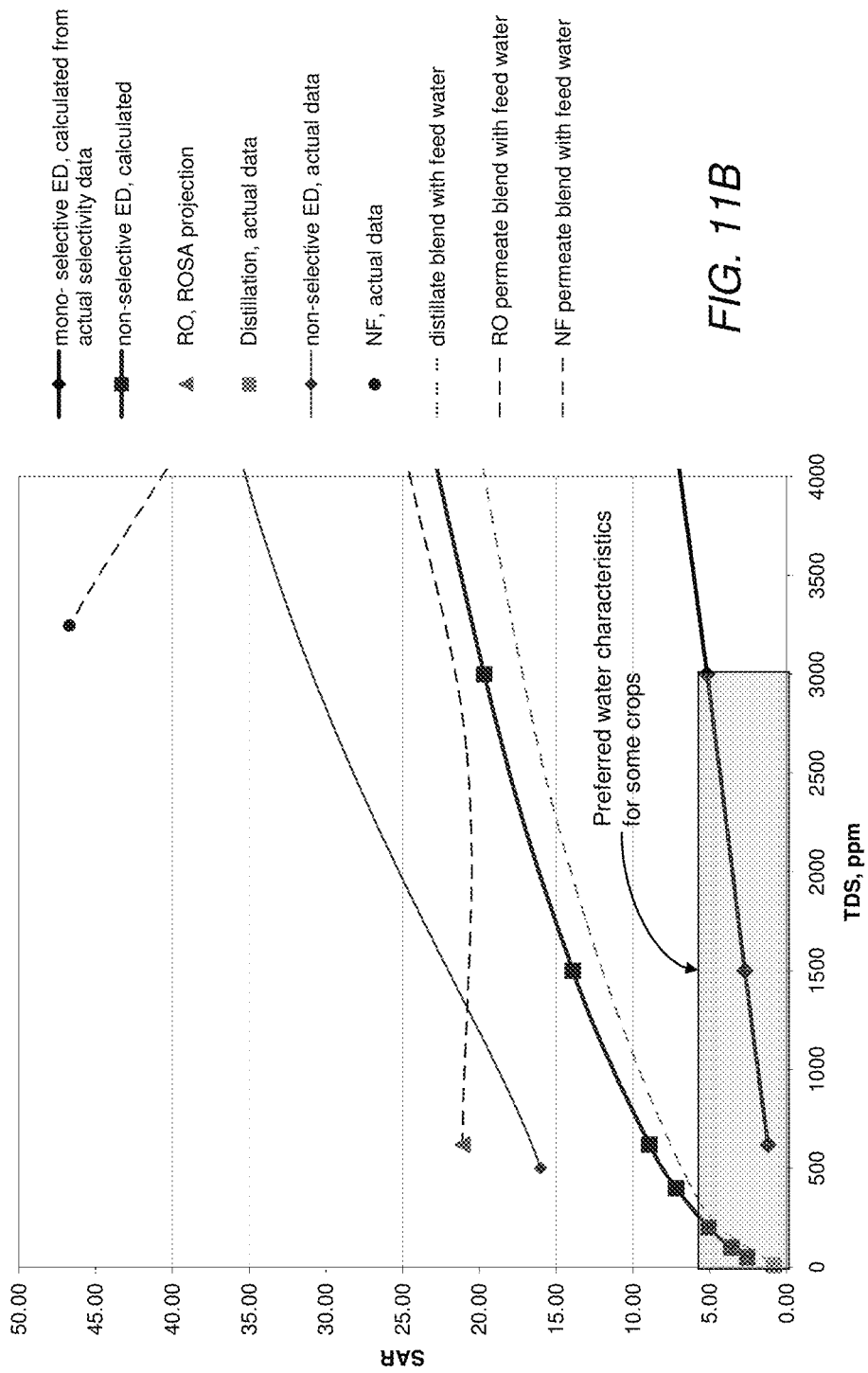

Some features of the invention involve systems and techniques comprising electrically-driven separation apparatus utilizing selective membranes as discussed above. As illustrated in FIG. 10, the quality of the treated water as represented by, for example, TDS content can be influenced by the selectivity of the membrane utilized. FIGS. 11A and 11B show the capabilities of the selective separation apparatus in accordance with some aspects of the invention. As shown in FIG. 11A, water, having a desirable set of characteristics, can be produced for irrigating crops by utilizing an electrically-driven separation apparatus. In some embodiments of the invention, electrically-driven separation apparatus utilize monovalent selective membranes to facilitate treating water, such as seawater and/or brackish water to provide water suitable for irrigation in agricultural facilities. In contrast, non-selective techniques or even non-monovalent selective techniques such as those that involve reverse osmosis apparatus or distillation apparatus as well as nanofiltration, generally cannot alone flexibly provide treated water that meets the target characteristics of the systems described herein. FIG. 11B illustrates in particular that electrically-driven separation apparatus comprising monovalent selective membranes may provide treated water having an acceptable sodium adsorption ratio and a TDS content above 2,500 ppm or even 3,000 ppm. Thus, some aspects of the invention can provide systems and techniques that target removal of undesirable species while retaining less objectionable species.

Further, because some embodiments of the invention can selectively remove monovalent species, any resultant secondary or concentrate streams would be less susceptible to scaling and fouling. This feature advantageously allows some separation embodiments of the invention to operate at higher water recovery rates, compared to non-selective techniques, because the volumetric rate of any secondary streams can be effectively reduced without or with less concern for undesirable precipitation. Thus, some embodiments of the invention directed to utilizing systems and techniques that selectively separate monovalent species can be operated at higher recovery rates compared to non-selective ED and distillation based separation apparatus, and even much higher recovery rates compared RO and NF based separation apparatus. Significantly, because RO and NF based separation systems selectively reduce the concentration of non-monovalent species, these processes cannot effectively provide treated water having low SAR values.

A further advantage of the selective separation systems and techniques of the invention pertains to the reduction or removal of non-ionized species that have little or no influence on crop growth. For example, silica is typically not preferentially removed in the ED-based systems of the invention thereby avoiding any scaling or fouling concerns in secondary streams that typically arise when treating silica-containing water in RO and distillation apparatus. In addition, because secondary streams of some embodiments of the invention typically have reduced scaling tendencies, the recovery rates in the separation systems and techniques of the invention may be greater than the recovery rates of RO and distillation based systems.

Controller 106 of the systems of the invention may be implemented using one or more computer systems. The computer system may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor or combinations thereof. The computer system may be implemented using specially-programmed, special-purpose hardware, for example, an application-specific integrated circuit (ASIC) or controllers intended for water treatment system.

The computer system can include one or more processors typically connected to one or more memory devices, which can comprise, for example, any one or more of a disk drive memory, a flash memory device, a RAM memory device, or other device for storing data. The memory component or subsystem is typically used for storing programs and data during operation of the system 100 and/or the computer system. For example, the memory component may be used for storing historical data relating to the parameters over a period of time, as well as operating data. Software, including programming code that implements embodiments of the invention, can be stored on a computer readable and/or writeable nonvolatile recording medium, and then typically copied into the memory subsystem wherein it can then be executed by one or more processors. Such programming code may be written in any of a plurality of programming languages, for example, Java, Visual Basic, C, C#, or C++, Fortran, Pascal, Eiffel, Basic, or any of a variety of combinations thereof.

Components of the computer system may be coupled by an interconnection mechanism, which may include one or more busses that provide communication between components that are integrated within a same device and/or a network that provide communication or interaction between components that reside on separate discrete devices. The interconnection mechanism typically enables communications, including but not limited to data and instructions to be exchanged between components of the system.

The computer system can also include one or more input devices, for example, a keyboard, mouse, trackball, microphone, touch screen, and one or more output devices, for example, a printing device, display screen, or speaker. In addition, computer system may contain one or more interfaces that can connect the computer system to a communication network, in addition or as an alternative to the network that may be formed by one or more of the components of the system.

According to one or more embodiments of the invention, the one or more input devices may include sensors for measuring parameters. Alternatively, the sensors, the metering valves and/or pumps, or all of these components may be connected to a communication network that is operatively coupled to the computer system. For example, one or more sensors 108 may be configured as input devices that are directly connected to controller 106, metering valves, pumps, and/or components of apparatus 102 may be configured as output devices that are connected to controller 108. Any one or more of such subcomponents or subsystems may be coupled to another computer system or component so as to communicate with the computer system over a communication network. Such a configuration permits one sensor to be located at a significant distance from another sensor or allow any sensor to be located at a significant distance from any subsystem and/or the controller, while still providing data therebetween.

The controller can include one or more computer storage media such as readable and/or writeable nonvolatile recording medium in which signals can be stored that define a program to be executed by the one or more processors. The medium may, for example, be a disk or flash memory. In typical operation, the processor can cause data, such as code that implements one or more embodiments of the invention, to be read from the storage medium into a memory that allows for faster access to the information by the one or more processors than does medium. The memory is typically a volatile, random access memory such as a dynamic random access memory (DRAM) or static memory (SRAM) or other suitable devices that facilitates information transfer to and from the one or more processors.

Although the control system is described by way of example as one type of computer system upon which various aspects of the invention may be practiced, it should be appreciated that the invention is not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by controller 106 can be performed in separate computers, which in turn, can be communication through one or more networks.

Although various embodiments exemplarily shown have been described as using sensors, it should be appreciated that the invention is not so limited. The invention contemplates the modification of existing facilities to retrofit one or more systems, subsystems, or components and implement the techniques of the invention. Thus, for example, an existing facility, especially an agricultural or crop-growing facility, can be modified to include one or more systems configured to provide irrigation water, potable water, or both, accordance with any one or more embodiments exemplarily discussed herein. Alternatively, existing systems and/or components or subsystems thereof can be modified to perform any one or more acts of the invention.

EXAMPLES

The function and advantages of these and other embodiments of the invention can be further understood from the examples below, which illustrate the benefits and/or advantages of the one or more systems and techniques of the invention but do not exemplify the full scope of the invention.

Example 1

This example describes the expected performance of an ED apparatus when utilized to selectively remove monovalent cations from a stream to be treated and produce treated water having a lower SAR value.

Figure 8:
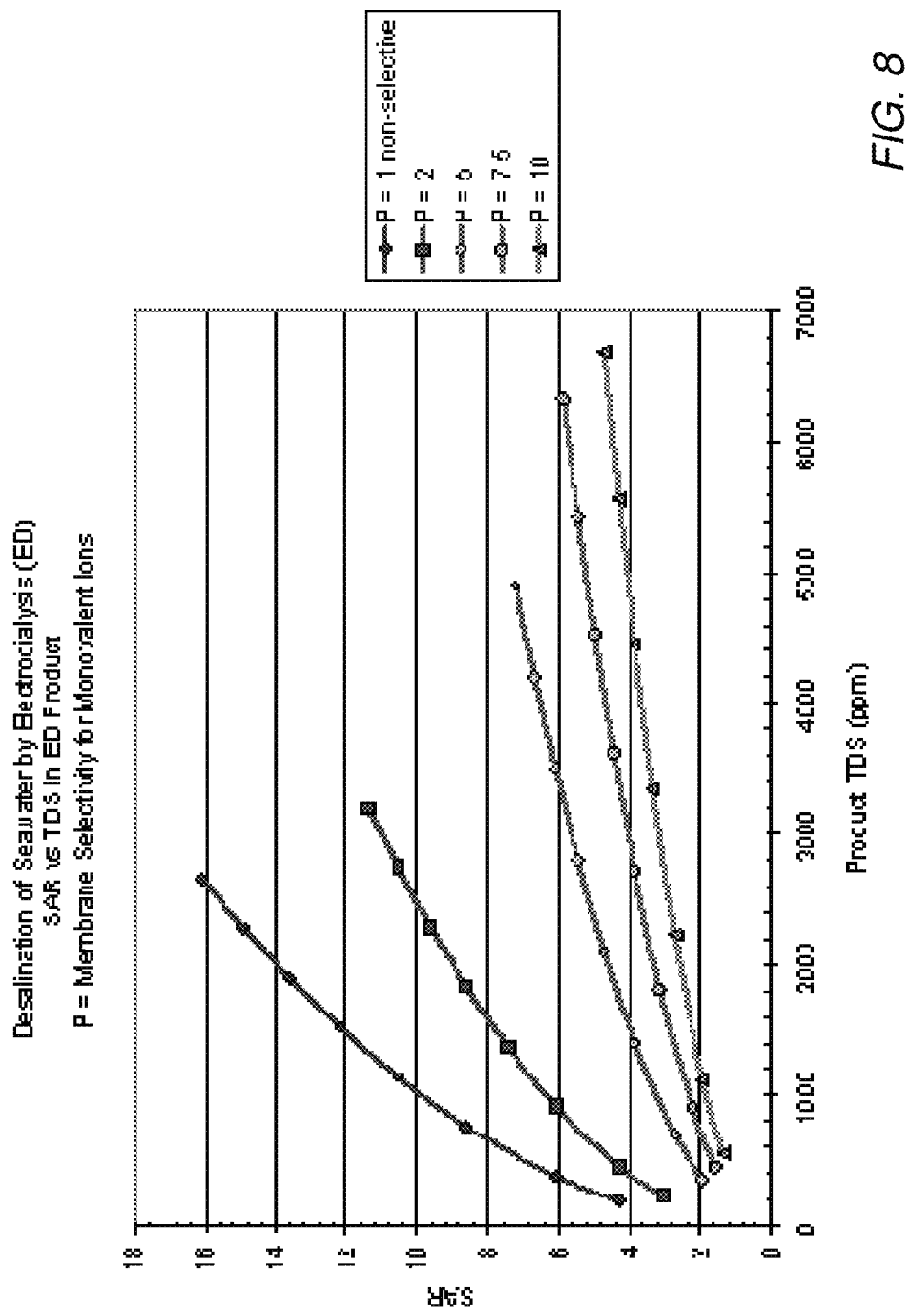
FIG. 8 is a graph showing the predicted sodium adsorption ratio of desalted water by electrodialysis relative to the total dissolved solids level utilizing monovalent selective cation membranes at various levels of selectivity, in accordance with some features of the invention.

FIG. 8 is a graph showing the SAR value in the treated water utilizing various monovalent selective membranes, with differing levels of selectivity. As shown, if the acceptable or desired SAR value is less than about 6, then a TDS level of about 3,500 ppm can be achieved with a monovalent selective membrane having a selectivity of about 5. Also, if the acceptable or desired SAR value is less than about 3, then a TDS level of about 2,700 ppm can be achieved with a monovalent selective membrane having a selectivity of about 10.

The predicted energy requirement for the ED apparatus is less than the predicted requirement utilizing the RO apparatus. Further, the predicted energy required to treat water in an electrically-driven separation apparatus of the invention is expected to be linearly affected by the salinity of the water to be treated. In some embodiments of the invention, the temperature of the feed stream can be adjusted to reduce the energy required to facilitate cost effective separation in an electrically-driven separation apparatus. For example, increasing the temperature of the feed stream comprising seawater by about 25° C. to provide for a product TDS level of about 1,500 ppm and a recovery of about 50%, can result in a predicted energy reduction of about 6% in an ED module.

Example 2

This example describes the performance of a system utilizing the techniques of the invention as substantially represented in the schematic illustration of FIG. 1, except that a controller was not utilized to adjust an operating parameter of the system.

The ED stack was comprised of ten effective cell pairs of concentrating and diluting compartments, five cell pairs in a downward flow path and five cell pairs in an upward flow path, providing for an overall fluid stream process flow path of about 28 inches. The cell pairs utilized cation selective membranes, CMS monovalent selective homogeneous membranes from Tokuyama Corporation to preferentially remove sodium cations, and heterogeneous ion exchange membranes for the anion selective membrane (IONPURE™ anion membrane, 0.018 inches thick). Spacer gaskets that were 0.020 inches thick and extruded screens about 70% open area and 0.020 inches thick were used to at least partially define the compartments. The ED apparatus was operated at an applied potential of about 2 volts per cell pair, through $RuO_2$-coated titanium electrodes.

The feed water was prepared by dissolving Instant Ocean® synthetic sea salt mixture, available from Spectrum Brands Inc., in deionized water. Sodium chloride was added as needed to provide a feed solution that had an SAR value of seawater (about 54).

The module was operated in a once-through mode wherein both the dilute and concentrate streams were returned to the feed tank. The electrode chambers were constructed as dilute compartments and fed separately. Calcium and magnesium species concentrations in the feed and product streams were determined by standard titration methods. The TDS level was calculated based on the measured conductivity. The sodium concentration was also calculated.

Tables 1 and 2 respectively show the inlet and product water stream characteristics. As shown in Table 2, the systems and techniques of the invention can provide a product water stream having one or more desired characteristics. For example, the systems and techniques of the invention can selectively reduce the concentration of monovalent species to provide water having a desired SAR value.

Figure 9:
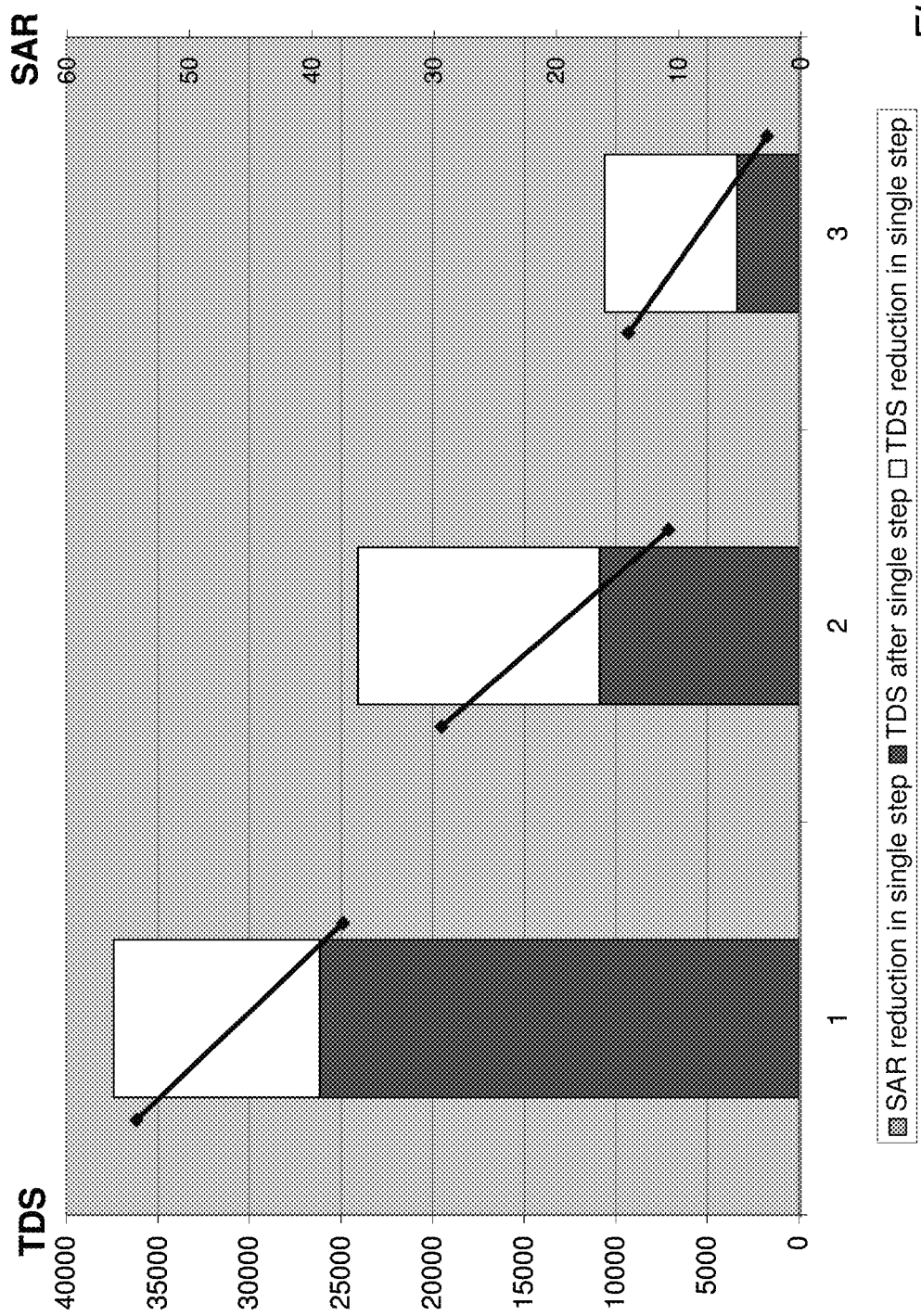
FIG. 9 is a graph showing staged treatment aspects of the invention to produce treated water having one or more desirable characteristics.

Further, the data presented in the tables show that coupling two or more electrically-driven separation apparatus can provide treated water having a desired SAR value. That is, a first electrically-driven separation apparatus can lower the SAR value of a water stream to provide an intermediate product stream having an intermediate SAR value. The intermediate product stream can in turn be introduced into a second electrically-driven separation apparatus to provide treated water having the desired SAR value. In particular, FIG. 9 shows that the TDS level and SAR value can be reduced to desirable levels by utilizing ED apparatus, having monovalent selective membranes, in about three stages based on this configuration. Other configurations may involve more or less stages to achieve one or more desired water characteristics.

The data further shows that various parameter can be adjusted tailor the SAR value in the product water. For example, the processing flow rate can be increased or decreased to achieve a target SAR value. Alternatively, or in conjunction with adjusting the flow rate, the applied potential and/or overall flow path length can be used as an adjustable operating parameter in one or more aspects of the invention.

TABLE 1

Feed Stream Characteristics.

| Flow Rate L/m | Conductivity mS/cm | Ca ppm | Mg ppm | TDS ppm | Na ppm | SAR — |
|---|---|---|---|---|---|---|
| 0.064 | 33.7 | 340 | 1940 | 24062 | 6397 | 29.4 |
| 0.072 | 33.7 | 340 | 1940 | 24062 | 6397 | 29.4 |
| 0.072 | 33.7 | 340 | 1940 | 24062 | 6397 | 29.4 |
| 0.076 | 34.7 | 352 | 1928 | 24836 | 6673 | 30.7 |
| 0.1 | 15.8 | 224 | 1196 | 10596 | 2418 | 14.1 |
| 0.122 | 33.7 | 340 | 1940 | 24062 | 6397 | 29.4 |
| 0.148 | 49.7 | 316 | 1784 | 37426 | 11339 | 54.4 |

TABLE 2

Product Stream Characteristics.

| Flow Rate L/m | Conductivity mS/cm | Ca ppm | Mg ppm | TDS ppm | Na ppm | SAR — |
|---|---|---|---|---|---|---|
| 0.064 | 16.0 | 236 | 1584 | 10766 | 2094 | 10.7 |
| 0.072 | 16.2 | 252 | 1588 | 10880 | 2116 | 10.8 |
| 0.072 | 22.1 | 284 | 1756 | 15164 | 3453 | 16.8 |
| 0.076 | 24.8 | 292 | 1720 | 17159 | 4192 | 20.5 |
| 0.1 | 5.2 | 124 | 740 | 3374 | 374 | 2.8 |
| 0.122 | 23.3 | 276 | 1724 | 16031 | 3800 | 18.6 |
| 0.148 | 36.4 | 268 | 1652 | 26163 | 7493 | 37.5 |

Example 3

This example compares the performance of electrically-driven separation apparatus to the performance of thermally-driven and pressure-driven separation apparatus.

The ED module utilized had ten cell pairs in a folded flow path so that the flow passed through five cell pairs of diluting and concentrating compartments then turned and passed through another five cell pairs. Each cell in the module was comprised of a screen and a 0.020 inch thick spacer. The cells were 14 inches by 1.2 inches. The monovalent cation selective membrane utilized was a CMS membrane from Tokuyama Soda Corporation. The anion selective membrane utilized was an IONPURE™ heterogeneous membrane. The ED module utilized platinum-coated titanium plates. The applied voltages and current, flow rates and feed compositions were varied to obtain various conditions of effective selectivity.

Tables 3 and 4 list the feed and product water stream properties. FIG. 10 is a graph showing the influence of the TDS level of the treated water relative to the selectivity of the membrane utilized in the ED module. The TDS content of the feed and product streams as well as the concentrations of sodium, calcium, and magnesium were analyzed. These measured values were utilized to calculate the effective selectivity according to the formula (2):

$$\text{Selectivity} = \frac{\frac{\Delta v_{Na}}{v_{Na}}}{2\left[\frac{\Delta v_{Ca} + \Delta v_{Mg}}{v_{Ca} + v_{Mg}}\right]}$$

where $v$ is the molarity of ionic species i and $\Delta v$ is the change in the molarity of ionic species i.

TABLE 3

Feed Stream Characteristics.

| | Ca ppm | Mg Ppm | TDS ppm | SAR — | Na ppm |
|---|---|---|---|---|---|
| 1 | 126 | 428 | 37426 | 121.66 | 12822 |
| 2 | 141 | 1928 | 24836 | 75.42 | 8283 |
| 3 | 136 | 1940 | 24062 | 72.92 | 8009 |
| 4 | 136 | 1940 | 24062 | 72.92 | 8009 |
| 5 | 136 | 1940 | 24062 | 72.92 | 8009 |
| 6 | 136 | 1940 | 24062 | 72.92 | 8009 |
| 7 | 355 | 5112 | 40268 | 72.13 | 12850 |
| 8 | 306 | 4396 | 35028 | 67.75 | 11193 |
| 9 | 234 | 3396 | 27129 | 59.78 | 8674 |
| 10 | 163 | 2340 | 19281 | 51.29 | 6184 |
| 11 | 98 | 1336 | 11356 | 39.93 | 3651 |
| 12 | 90 | 1196 | 10596 | 39.45 | 3419 |
| 13 | 32 | 384 | 4014 | 26.5 | 1313 |
| 14 | 32 | 384 | 4014 | 26.5 | 1313 |

TABLE 4

Product Stream Characteristics and Calculated Selectivity.

| | Ca ppm | Mg ppm | TDS ppm | SAR — | Na ppm | Selectivity — |
|---|---|---|---|---|---|---|
| 1 | 107 | 396 | 26163 | 87.84 | 8852 | 1.8 |
| 2 | 292 | 1720 | 17159 | 54.42 | 5614 | 1.4 |
| 3 | 276 | 1724 | 16031 | 50.72 | 5217 | 1.4 |
| 4 | 252 | 1588 | 10880 | 34.66 | 3420 | 1.5 |
| 5 | 284 | 1756 | 15164 | 47.14 | 4897 | 1.8 |
| 6 | 236 | 1584 | 10766 | 34.51 | 3386 | 1.4 |
| 7 | 804 | 5036 | 34123 | 60.92 | 10707 | 3.1 |
| 8 | 704 | 4276 | 29348 | 56.79 | 9217 | 2.5 |
| 9 | 536 | 3324 | 21566 | 47.05 | 6724 | 3.7 |
| 10 | 304 | 1972 | 8897 | 23.73 | 2604 | 1.7 |
| 11 | 188 | 1148 | 6187 | 22.26 | 1871 | 1.6 |

TABLE 4-continued

Product Stream Characteristics and Calculated Selectivity.

| | Ca ppm | Mg ppm | TDS ppm | SAR — | Na ppm | Selectivity — |
|---|---|---|---|---|---|---|
| 12 | 124 | 740 | 3374 | 14.58 | 986 | 0.9 |
| 13 | 44 | 236 | 1321 | 10.4 | 400 | 0.9 |
| 14 | 32 | 168 | 651 | 5.57 | 181 | 0.8 |

The data in Tables 3 and 4 as well as FIG. 10 show that as the TDS content of the feed water decreases the selectivity of the cation selective membrane also decreases. The correlation of selectivity to TDS determined to follow the formula (3):

$$\text{Selectivity} = 0.5905 + (5 \times 10^{-5})(\text{TDS})$$

This selectivity/TDS relationship was then utilized to characterize the capabilities electrically-driven separation apparatus in accordance with the invention in terms of a composite characteristic as represented in FIGS. 11A and 11B, relative to other non-selective techniques reverse osmosis, distillation, and nanofiltration.

It is assumed that about 96% of the monovalent cationic species in seawater is sodium and about 4% is potassium. Further, all the cationic species is assumed to constitute about 37% of the TDS content such that the change in TDS can be determined according to the formula (4):

$$23\left(\frac{\Delta v_{Na}}{0.96}\right) + 40(\Delta v_{Ca}) + 24(\Delta v_{Mg}) = 0.37(\Delta TDS)$$

Further assuming that the divalent species calcium and magnesium behave similarly when being removed in the electrically-driven separation apparatus, the following formula can be utilized:

$$\frac{\Delta v_{Ca}}{v_{Ca}} = \frac{\Delta v_{Mg}}{v_{Mg}}.$$

The above assumptions utilizing formulas (2), (3), and (4) were used to predict the product water SAR value relative to TDS level. The results are presented in FIGS. 11A and 11B, the latter showing an enlarged section of the former. FIG. 11B, which includes an overlay defining a region of preferred characteristics for some crops, shows that the separation techniques of the invention can provide a plurality of actual product streams that satisfy or span the limits the set of target characteristics. Notably, the separation systems and techniques of the invention provide intermediate and/or tailorable features that cannot be directly achieved with the non-selective alternatives. Nonetheless, to provide a comparative basis, intermediate properties of treated water were approximated by approximating an assumed blend of the actual resultant product with a proportionate amount of raw or untreated seawater. For example, to provide an estimate of the nature of the SAR/TDS relationship for distilled water product, feed seawater was mixed with actual distillate water to predict the characteristic values of an intermediate product. Although such practices are not typical employed, the illustrated predicted intermediate characteristics, as noted by the dashed line connecting actual data, were presented to provide a comparison relative to the selective separation systems. The nature of the SAR/TDS relationship for reverse osmosis and nanofiltration systems were likewise approximated by estimating the properties of a theoretically blended product. Thus, for each of the discrete, non-tailorable technique, dashed lines connecting actual data points represent an hypothetically achievable tailorable product whereas solid lines connecting actual data values show achievable tailorable product.

The actual distillate water properties were obtained from a publication by the U.S. Dept. of Interior, Bureau of Reclamation, Denver Office, titled "Water Treatment Technology Program Report," no. 7, 1995. The actual data for non-selective ED product water properties were obtained from a publication by Turek, M., "Cost Effective Electrodialytic Seawater Desalination," Desalination, no. 153, pp. 371-376, 2002. The actual data for nanofiltered product water properties were obtained from a publication by Tseng, et al., "Optimization of Dual-Staged NF Membranes for Seawater Desalination," AWWA 2003 CA-NV An. Fall Conf., 2003.

Having now described some illustrative embodiments of the invention, it should be apparent to those skilled in the art that the foregoing is merely illustrative and not limiting. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. For example, ED and EDI apparatus may be combined in a two-stage process wherein the ED apparatus reduces the TDS level in seawater to a range of about 5,000 ppm to about 6,000 ppm and the EDI apparatus subsequently reduces the TDS level to a range of about 1,500 ppm to about 2,000 ppm.

Further, acts, elements, and features discussed only in connection with one embodiment are not intended to be excluded from a similar role in other embodiments.

It is to be appreciated that various alterations, modifications, and improvements can readily occur to those skilled in the art and that such alterations, modifications, and improvements are intended to be part of the disclosure and within the spirit and scope of the invention. For example, the sodium adsorption ratio may be represented according to an alternative formula (5):

$$adjRNa = \frac{Na}{\sqrt{\frac{Ca_x + Mg}{2}}}$$

where Na is the sodium concentration in the water, in me/L; $Ca_x$ is a modified calcium value, in me/L, that represents calcium species concentration in the water with compensation due to the salinity of the water, the $HCO_3/Ca$ ratio (in me/L), and the estimated partial pressure of $CO_2$ in the soil surface; and Mg is the concentration of magnesium species in the water, in me/L.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims.

Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Further the use of the term "potable" with reference to water, especially treated water, does not limit the scope of the inventive subject matter and can refer to water suitable for livestock use, including consumption.

What is claimed is:

1. A water treatment system for producing water for irrigation, the system comprising:
    an electrodialysis apparatus including one or more monovalent ion selective membranes and having an inlet fluidly connectable to a source of brackish water to be treated, a diluate outlet, and a concentrate outlet;
    a nanofiltration apparatus positioned downstream of the electrodialysis apparatus and having an inlet in fluid communication with the diluate outlet of the electrodialysis apparatus, a filtrate outlet, and a retentate outlet;
    an irrigation distribution system in fluid communication with the retentate outlet of the nanofiltration apparatus and with the diluate outlet of the electrodialysis apparatus;
    a diverting valve configured to vary an amount of diluate from the electrodialysis apparatus directed to the irrigation distribution system and an amount of diluate from the electrodialysis apparatus directed to the nanofiltration apparatus;
    a controller configured to adjust the amount of diluate from the electrodialysis apparatus directed to the irrigation distribution system and the amount of diluate from the electrodialysis apparatus directed to the nanofiltration apparatus with the diverting valve;
    an electrically operated separation apparatus having an inlet in fluid communication with the filtrate outlet of the nanofiltration apparatus, a diluate outlet, and a concentrate outlet; and
    a second diverting valve configured to adjust an amount of concentrate from the electrically operated separation apparatus directed to the electrodialysis apparatus as diluate makeup or as concentrate makeup.

2. The water treatment system of claim 1, further comprising a pre-filtration system in fluid communication between the source of brackish water to be treated and the inlet of the electrodialysis apparatus.

3. The water treatment system of claim 2, wherein a pre-filtration system includes one of a microfilter, a settler, and a coarse particle filter.

4. The water treatment system of claim 1, wherein one or more monovalent ion selective membranes include one or more monovalent cation selective membranes.

5. The water treatment system of claim 4, wherein the one or more monovalent cation selective membranes have a selectivity of at least about 2.

6. The water treatment system of claim 5, wherein the one or more monovalent cation selective membranes have a selectivity of about 5.

7. The water treatment system of claim 4, wherein the one or more monovalent ion selective membranes further include one or more monovalent anion selective membranes.

8. The water treatment system of claim 7, wherein the one or more monovalent anion selective membranes have a selectivity of about 5.

9. The water treatment system of claim 1, wherein the electrodialysis apparatus is configured to produce diluate having a sodium adsorption ratio (SAR) value of less than about 20.

10. The water treatment system of claim 9, wherein the electrodialysis apparatus is configured to produce diluate having a SAR value of less than about 9.

11. The water treatment system of claim 1, further including a mixer configured to blend diluate produced in the electrodialysis apparatus with any retentate produced in the nanofiltration apparatus.

12. The water treatment system of claim 11, wherein the mixer is configured to produce irrigation water having a SAR value intermediate of a SAR value of the diluate and a SAR value of the retentate.

13. The water treatment system of claim 1, further comprising a sensor in communication with the controller, the sensor configured to provide the controller with an indication of one or more parameters of one of diluate from the electrodialysis apparatus and retentate from the nanofiltration apparatus, the controller configured to adjust the diverting valve responsive to the indication of the one or more parameters.

14. The water treatment system of claim 1, further comprising a sensor in communication with a controller, the sensor configured to provide the controller with an indication of one or more parameters of one of diluate from the electrodialysis apparatus and retentate from the nanofiltration apparatus, the controller configured to adjust one or more operating parameters of the electrodialysis apparatus responsive to the indication of the one or more parameters.

15. A method of treating brackish water to produce irrigation water, the method comprising:
    directing brackish water to be treated to an inlet of an electrodialysis apparatus including one or more monovalent ion selective membranes, a diluate outlet, and a concentrate outlet;
    treating the brackish water to be treated in the electrodialysis apparatus to produce a diluate;
    determining an amount of the diluate to direct to an inlet of a nanofiltration apparatus positioned downstream of the electrodialysis apparatus and having an inlet in fluid communication with the diluate outlet of the electrodialysis apparatus, a filtrate outlet, and a retentate outlet, and an amount of the diluate to direct to an irrigation distribution system in fluid communication with the retentate outlet of the nanofiltration apparatus and with the diluate outlet of the electrodialysis apparatus;

directing at least a portion of the diluate to the irrigation distribution system;

varying an amount of diluate from the electrodialysis apparatus directed to the irrigation distribution system and an amount of diluate from the electrodialysis apparatus directed to the nanofiltration apparatus using a diverting valve and a controller configured to adjust the amount of diluate from the electrodialysis apparatus directed to the irrigation distribution system and the amount of diluate from the electrodialysis apparatus directed to the nanofiltration apparatus with the diverting valve;

treating any diluate directed to the inlet of a nanofiltration apparatus in the nanofiltration apparatus to produce a filtrate and a retentate;

directing the filtrate from the nanofiltration apparatus to an electrically operated separation apparatus having an inlet in fluid communication with the filtrate outlet of the nanofiltration apparatus, a diluate outlet, and a concentrate outlet; and adjusting an amount of concentrate from the electrically operated separation apparatus directed to the electrodialysis apparatus as diluate makeup or as concentrate makeup using a second diverting valve; and combining any retentate from the nanofiltration apparatus with the portion of the diluate from the electrodialysis apparatus directed to the irrigation distribution system at the irrigation distribution system.

16. The method of claim 15, wherein producing the diluate in the electrodialysis apparatus comprises producing treated water having a SAR value of less than about 20.

17. The method of claim 16, wherein producing the diluate in the electrodialysis apparatus comprises producing treated water having a SAR value of less than about 9.

18. The method of claim 16, wherein producing the retentate in the nanofiltration apparatus comprises producing treated water having a SAR value of less than the SAR value of the diluate.

19. The method of claim 16, wherein producing the retentate and the permeate in the nanofiltration apparatus comprises producing retentate having a SAR value less than a SAR value of the permeate.

20. The method of claim 16 wherein combining any retentate with the portion of the diluate directed to the irrigation distribution system comprises producing irrigation water with a SAR value intermediate of a SAR value of the diluate and a SAR value of the retentate.

21. The method of claim 15, further comprising adjusting an amount of diluate from the electrodialysis apparatus directed to the irrigation distribution system and the amount of diluate from electrodialysis apparatus directed to the nanofiltration apparatus based on one or more parameters of one of the diluate from the electrodialysis apparatus and any retentate from the nanofiltration apparatus.

22. The method of claim 15, further comprising pre-filtering the water to be treated prior to directing the water to be treated to the inlet of the electrodialysis apparatus.

23. The method of claim 15, further comprising adjusting a pH of one of the diluate and any retentate.

* * * * *